(12) United States Patent
Palfreyman et al.

(10) Patent No.: US 9,696,019 B2
(45) Date of Patent: Jul. 4, 2017

(54) LED LIGHTING STRUCTURE

(71) Applicants: Paul Palfreyman, Vancouver (CA);
Philippe Schick, Vancouver (CA);
Michael A. Tischler, Vancouver (CA)

(72) Inventors: Paul Palfreyman, Vancouver (CA);
Philippe Schick, Vancouver (CA);
Michael A. Tischler, Vancouver (CA)

(73) Assignee: COOLEDGE LIGHTING INC.,
Richmond, British Columbia (CA)

( * ) Notice: Subject to any disclaimer, the term of this patent is extended or adjusted under 35 U.S.C. 154(b) by 141 days.

(21) Appl. No.: 14/711,891

(22) Filed: May 14, 2015

(65) Prior Publication Data

US 2015/0276189 A1 Oct. 1, 2015

Related U.S. Application Data

(63) Continuation-in-part of application No. 14/303,197, filed on Jun. 12, 2014, now Pat. No. 9,494,305, which
(Continued)

(51) Int. Cl.
*F21V 21/14* (2006.01)
*F21V 23/06* (2006.01)
*G09F 13/00* (2006.01)
*G09F 13/22* (2006.01)
*F21V 33/00* (2006.01)
*F21L 4/00* (2006.01)
(Continued)

(52) U.S. Cl.
CPC ............... *F21V 21/14* (2013.01); *F21L 4/00* (2013.01); *F21V 23/06* (2013.01); *F21V 33/00* (2013.01); *G06F 1/1616* (2013.01); *G09F 13/00* (2013.01); *G09F 13/22* (2013.01); *F21K 9/20* (2016.08); *F21L 4/08* (2013.01); *F21V 17/007* (2013.01); *F21V 21/08* (2013.01); *F21V 31/005* (2013.01); *F21Y 2105/10* (2016.08); *F21Y 2115/10* (2016.08); *G09F 2013/222* (2013.01)

(58) Field of Classification Search
CPC .......... F21V 21/14; F21V 23/06; F21V 33/00; F21V 17/007; F21V 21/08; F21V 31/005; F21V 21/025; F21V 15/01; F21V 15/012; F21L 4/00; F21L 4/08; G06F 1/1616; G09F 13/00; G09F 13/22; G09F 2013/222; F21K 9/20; F21Y 2105/10; F21Y 2115/10
See application file for complete search history.

(56) References Cited

U.S. PATENT DOCUMENTS 6,299,337 B1 10/2001 Bachl et al.
8,262,249 B2 9/2012 Hsia et al.
(Continued)

FOREIGN PATENT DOCUMENTS

WO 00/50809 A1 8/2000

OTHER PUBLICATIONS

International Search Report and Written Opinion issued in a corresponding International Application No. PCT/US2015/030812 dated Aug. 13, 2015.

*Primary Examiner* — Bao Q Truong
(74) *Attorney, Agent, or Firm* — Morgan, Lewis & Bockius LLP

(57) ABSTRACT

In accordance with various embodiments, planar light sheets are conformed to interior volumes of housings to produce predetermined spatial optical characteristics such as luminous intensity distributions.

37 Claims, 12 Drawing Sheets

Related U.S. Application Data is a continuation-in-part of application No. 14/301,859, filed on Jun. 11, 2014, now Pat. No. 9,506,633, and a continuation-in-part of application No. 14/195,175, filed on Mar. 3, 2014, now Pat. No. 8,884,534, which is a continuation of application No. 13/970,027, filed on Aug. 19, 2013, now Pat. No. 8,704,448, which is a continuation-in-part of application No. 13/799,807, filed on Mar. 13, 2013, now Pat. No. 8,947,001.

(60) Provisional application No. 61/993,455, filed on May 15, 2014, provisional application No. 61/834,183, filed on Jun. 12, 2013, provisional application No. 61/697,411, filed on Sep. 6, 2012.

(51) Int. Cl.
| | | |
|---|---|---|
| *G06F 1/16* | (2006.01) | |
| *F21V 31/00* | (2006.01) | |
| *F21L 4/08* | (2006.01) | |
| *F21V 17/00* | (2006.01) | |
| *F21V 21/08* | (2006.01) | |
| *F21K 9/20* | (2016.01) | |
| *F21Y 105/10* | (2016.01) | |
| *F21Y 115/10* | (2016.01) | |

(56) References Cited

U.S. PATENT DOCUMENTS

| | | | |
|---|---|---|---|
| 8,704,448 B2* | 4/2014 | Tischler | H05B 33/0821 |
| | | | 315/185 R |
| 8,884,534 B2* | 11/2014 | Tischler | H05B 33/0821 |
| | | | 315/185 R |
| 8,947,001 B2* | 2/2015 | Tischler | H05B 33/0827 |
| | | | 315/185 R |
| 9,494,305 B2* | 11/2016 | Tischler | F21V 21/14 |
| 9,506,633 B2* | 11/2016 | Tischler | F21V 31/005 |
| 2004/0037079 A1 | 2/2004 | Luk | |
| 2011/0095974 A1 | 4/2011 | Moriwaki | |

* cited by examiner

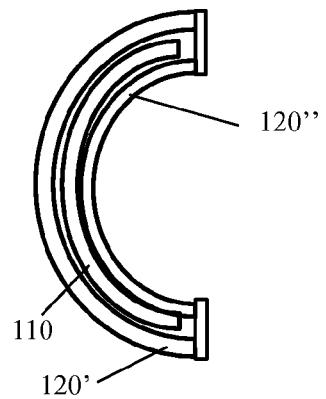
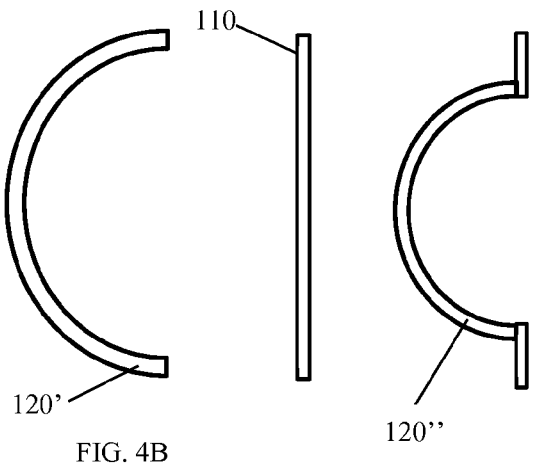
FIG. 4A
FIG. 4B
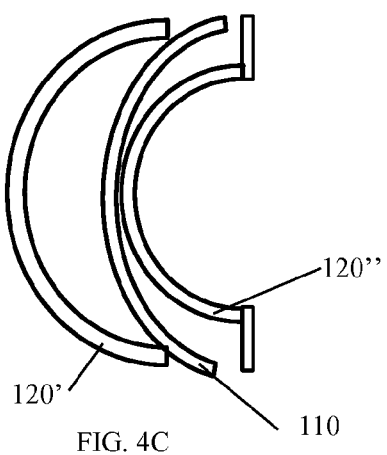
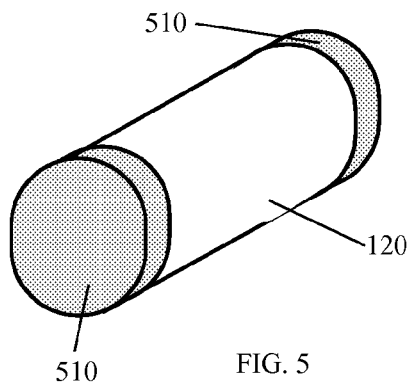
FIG. 4C
FIG. 5
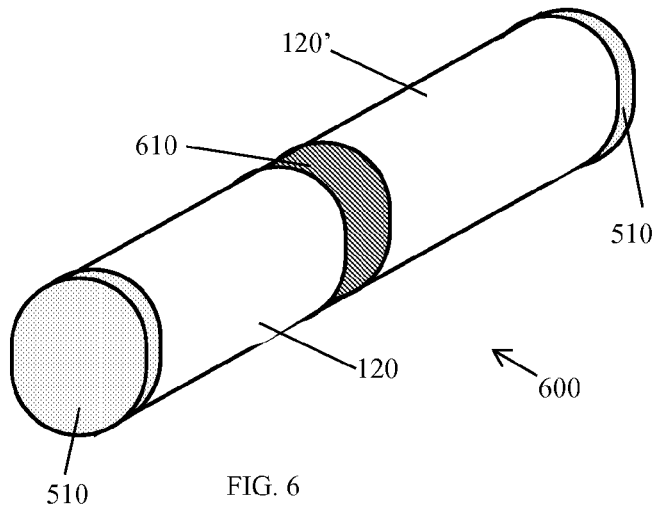
FIG. 6

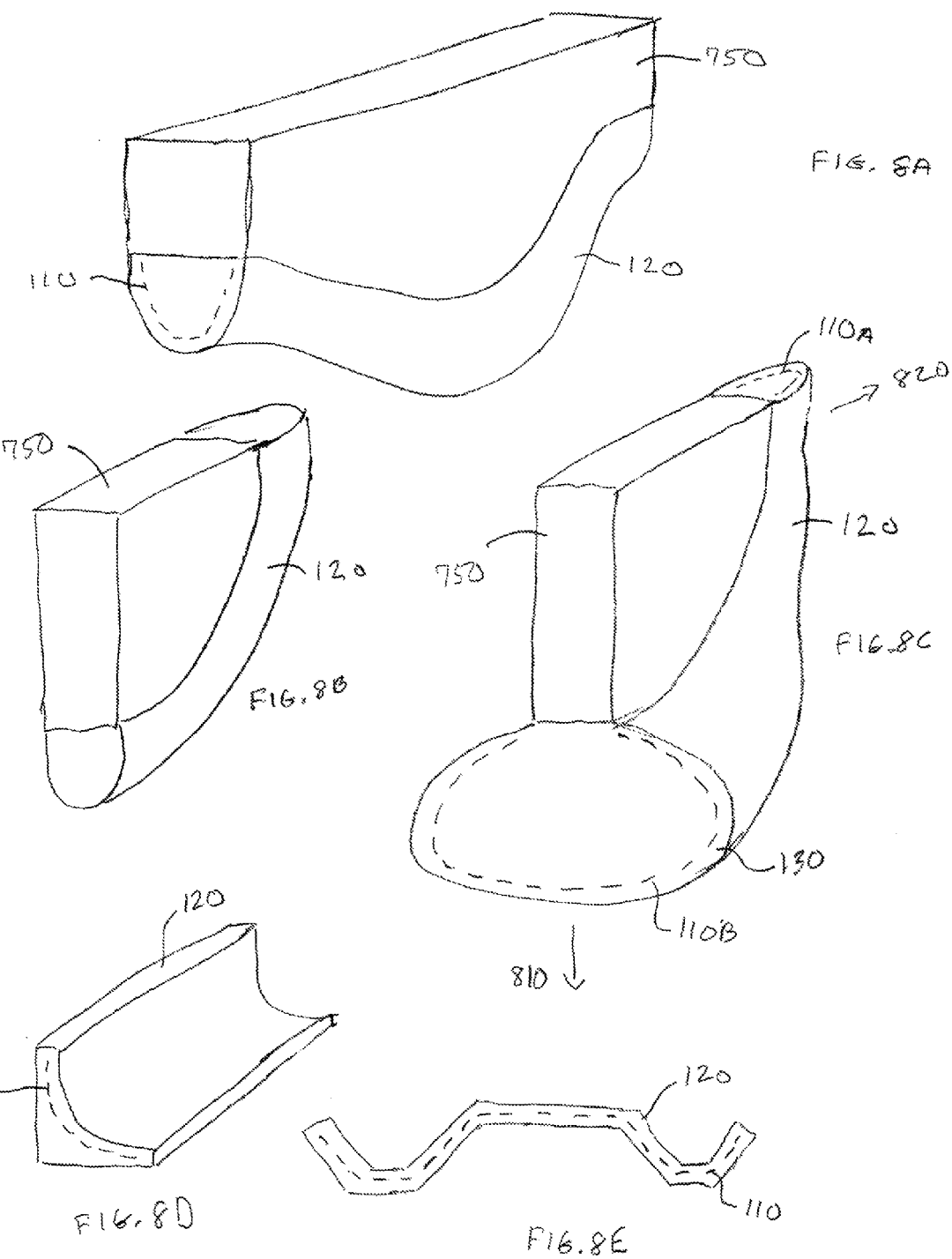

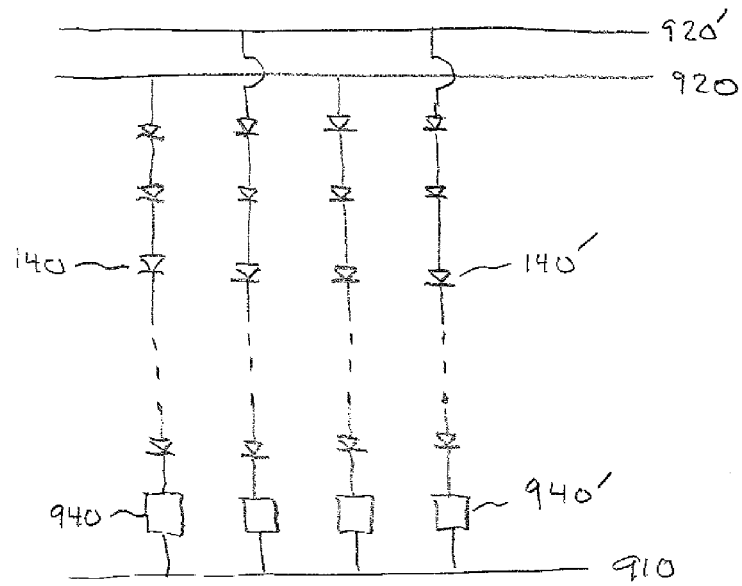
FIG. 11A
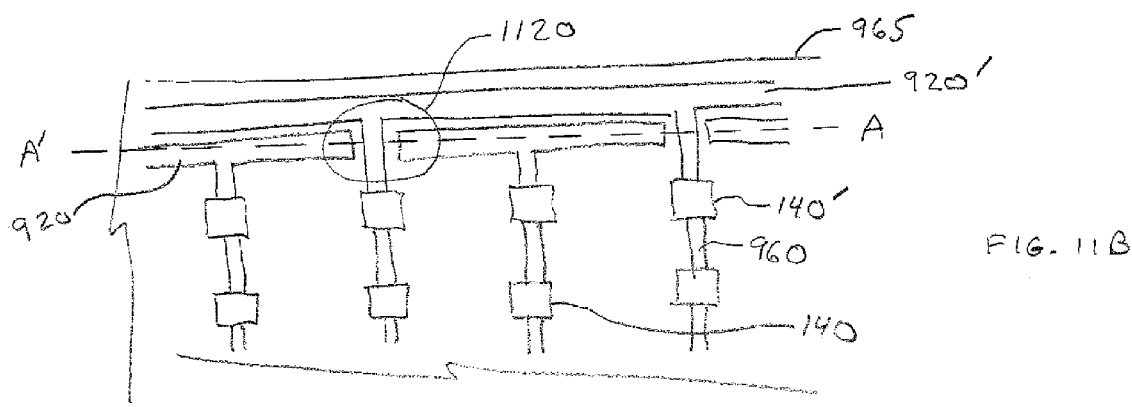
FIG. 11B
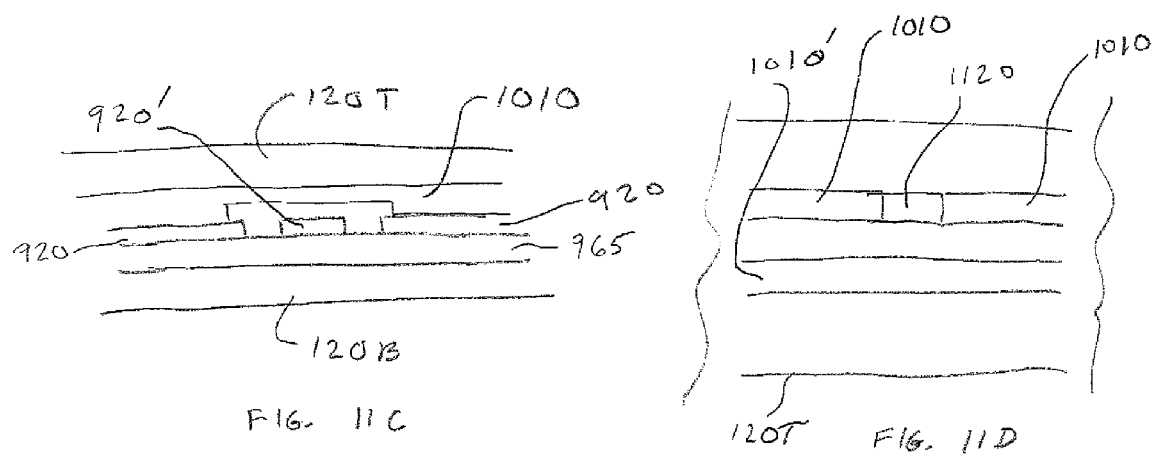
FIG. 11C
FIG. 11D

LED LIGHTING STRUCTURE

RELATED APPLICATIONS

This application claims the benefit of and priority to U.S. Provisional Patent Application No. 61/993,455, filed May 15, 2014. This application is also a continuation-in-part of U.S. patent application Ser. No. 14/303,197, filed Jun. 12, 2014, which claims the benefit of and priority to U.S. Provisional Patent Application No. 61/834,183, filed Jun. 12, 2013. This application is also a continuation-in-part of U.S. patent application Ser. No. 14/301,859, filed Jun. 11, 2014, which (i) claims the benefit of and priority to U.S. Provisional Patent Application No. 61/834,183, filed Jun. 12, 2013, and (ii) is a continuation-in-part of U.S. patent application Ser. No. 14/195,175, filed on Mar. 3, 2014, which is a continuation of U.S. patent application Ser. No. 13/970,027, filed Aug. 19, 2013, which is a continuation-in-part of U.S. patent application Ser. No. 13/799,807, filed Mar. 13, 2013, which claims the benefit of and priority to U.S. Provisional Patent Application No. 61/697,411, filed Sep. 6, 2012. The entire disclosure of each of these references is hereby incorporated herein by reference.

FIELD OF THE INVENTION

In various embodiments, the present invention generally relates to electronic devices, and more specifically to array-based lighting devices.

BACKGROUND

Solid-state lighting is an attractive alternative to incandescent and fluorescent lighting systems for a wide range of applications because of its relatively higher efficiency, robustness, and long life. In many cases, the long operational life of LEDs permits installation into systems such as fixtures, housings, or extrusions without provision for changing the LED source(s), because the LED lifetime exceeds the expected system lifetime. In many applications it is desired to minimize the size and/or volume of such systems. However, conventional LED systems typically require some form of heat-sinking or thermal management that is difficult to incorporate, particularly in relatively small and enclosed spaces. This is a particular issue for systems formed within a housing or extrusion. In such cases, the housing or extrusion typically must be large enough to accommodate not only the LEDs, circuit boards, and any heat sinks, but also must be engineered to not overheat from heat generated by the LEDs during operation. Such constraints may require additional ventilation, for example, passive ventilation or active ventilation such as fans, to prevent deleterious heat buildup. These issues typically lead to undesirably large, thick, and potentially complicated lighting systems.

In some applications it may be desirable for the housing of an LED-based lighting system to provide additional functionality, for example to aid in light distribution control, e.g., by using optics to achieve a specific light distribution pattern. For example, cove lighting or wall wash lighting systems often include a housing incorporating optics to achieve the desired light distribution patterns. The size and complexity of the optical elements are related to the size of the light source and the desired light distribution pattern, in many cases leading again to undesirably large systems.

In some applications the housing may provide protection for the LEDs, for example mechanical protection (e.g., protection against an object hitting or crushing the lighting system) or protection from environmental factors such as water, rain, snow, or the like. Outdoor applications typically require a housing for physical and environmental protection of the LEDs and associated circuitry. Such housings are often undesirably large because of the need to enclose the LEDs, circuit board, heat sinks, and associated control and drive circuitry.

Finally, many applications for backlighting and illuminated panels and signs require custom sizing to fit in a particular location. Systems featuring relatively few high-brightness LEDs on rigid circuit boards may be difficult to use cost-effectively in a wide range of installations while achieving high illumination uniformity and high efficiency.

Accordingly there is a need for solutions that provide LED-based lighting systems having a small form factor, provide the desired light distribution pattern, and which are simple to install.

SUMMARY

Embodiments of the present invention relate to illumination systems based on flexible light sheets and that incorporate additional functionality that enables various different mechanical mounting and electrical and/or mechanical joining techniques. For example, illumination systems in accordance with embodiments of the invention incorporate rigid, semi-rigid, flexible, and/or positionable housings that at least partially enclose flexible light sheets and that may also provide electrical connectivity.

In various embodiments of the present invention, flexible planar light sheets incorporating light-emitting elements are deformed to fit within three-dimensional, non-planar interior volumes of housings. As used herein, a light sheet may be deformed by being bent, curved, folded, and/or creased, either temporarily or permanently. That is, a deformed light sheet may recover to its undeformed, planar configuration in the absence of a deforming force and/or when not disposed within the shaped housing. In their undeformed states, light sheets in accordance with embodiments of the invention typically emit light having a particular spatial optical characteristic (e.g., a luminous intensity distribution, a correlated color temperature distribution, a color rendering index distribution, and/or a spectral power distribution), and, when deformed within a housing, the light sheets emit light having a different spatial optical characteristic. In various embodiments of the invention, light sheets are deformed via bending or curving, and the resulting radius of curvature of the light sheet is less than a maximum bending tolerance of the light sheet (i.e., the maximum amount of bending before the light sheet undergoes partial or complete mechanical or electrical failure).

Additional details of lighting systems in accordance with embodiments of the present invention appear within U.S. patent application Ser. No. 13/799,807, filed Mar. 13, 2013 (the '807 application), and U.S. patent application Ser. No. 13/748,864, filed Jan. 24, 2013 (the '864 application), the entire disclosure of each of which is incorporated by reference herein.

In an aspect, embodiments of the invention feature a lighting system that includes or consists essentially of a flexible light sheet and a housing having a three-dimensional, non-planar interior volume. The light sheet includes or consists essentially of (i) a flexible substrate having first and second opposed surfaces, (ii) a plurality of light-emitting elements disposed over at least one of the first or second surfaces of the substrate, and (iii) a plurality of conductive traces disposed on the substrate and electrically interconnecting the plurality of light-emitting elements. When the light sheet is in an undeformed configuration, (a) the light sheet is substantially planar and (b) the light-emitting elements of the light sheet collectively emit light having a first spatial optical characteristic. The light sheet is disposed within the interior volume of the housing. The light sheet is deformed to conform to the interior volume of the housing. The light-emitting elements of the light sheet collectively emit light through the housing with a second spatial optical characteristic different from the first spatial optical characteristic.

Embodiments of the invention may include one or more of the following in any of a variety of combinations. The first and/or second spatial optical characteristics may include or consist essentially of luminous intensity distributions. The first and/or second spatial optical characteristics may each include or consist essentially of a luminous intensity distribution, a correlated color temperature distribution, a color rendering index distribution, and/or a spectral power distribution. The light-emitting elements may or may not be in physical contact with at least a portion of the interior surface of the housing. The deformed light sheet may include or consist essentially of at least two portions. Two or more of the portions (even each portion) may have a different curvature. At least one portion may be substantially planar. Two or more of the portions (even each portion) may be non-coplanar. The deformed light sheet may include one or more folds (i.e., regions along which the light sheet is at least partially folded over on itself). The interior volume of the housing may be defined by and disposed between interior and exterior surfaces of the housing. The light sheet may be disposed between the interior and exterior surfaces of the housing. The light-emitting elements may be disposed over both the first and second surfaces of the substrate (e.g., both first and second surfaces of the substrate may have light-emitting elements disposed thereon). The housing may define an opening, at least at one of two opposed ends, for accessing the interior volume. The housing may be a unitary (i.e., one-piece) structure, e.g., an extrusion. The housing may include or consist essentially of at least two joined sections. The sections may be removable from each other. At least one end cap may cover at least a portion of the opening. The end cap may be removable. The housing may include mounting hardware for mounting the lighting system. The housing may define an opening for accessing the interior volume. At least one end cap may cover the opening. The at least one end cap may be removable. The housing may include or consist essentially of at least two joined sections. The sections may be removable from each other. The housing may include mounting hardware for mounting the lighting system.

The light sheet may include first and second spaced-apart power conductors for supplying power to the light-emitting elements. One or more electrical connectors may be disposed on the housing (e.g., on an interior and/or on an exterior surface of the housing). The one or more electrical connectors may include or consist essentially of (i) a first electrical connector electrically coupled to the first power conductor and (ii) a second electrical connector electrically coupled to the second power conductor. One or more electrical connectors may extend outside of the housing, and the one or more electrical connectors may provide electrical coupling to the first and/or second power conductors from outside of the housing. Portions of the housing may be electrically conductive and may provide electrical coupling to the first and second power conductors from outside of the housing.

The plurality of light-emitting elements may be spaced apart and interconnected, via the plurality of conductive traces, into one or more light-emitting strings. Each light-emitting string may have (i) a first end electrically connected to the first power conductor and (ii) a second end electrically connected to the second power conductor. The light sheet may include one or more control elements each configured to control current to one or more of the light-emitting strings. The one or more control elements may be disposed on the first and/or second surfaces of the substrate. The one or more control elements may each be electrically coupled to at least one (or only one) light-emitting string. The substrate may be separable, via a cut spanning the first and second power conductors and not crossing a first light-emitting string, into two partial substrates each including or consisting essentially of (i) one or more light-emitting strings and (ii) portions of the first and second power conductors configured to supply power to and thereby illuminate the one or more light-emitting strings of the partial substrate. Along each light-emitting string, a first pitch (or spacing) at which the first light-emitting elements are spaced may be substantially constant. The one or more light-emitting strings may include or consist essentially of a plurality of light-emitting strings. Over the substrate, the light-emitting elements may be spaced apart at the first pitch, and the first pitch may be maintained between light-emitting elements of different ones of the light-emitting strings.

The lighting system may include a power supply for energizing the plurality of light-emitting elements. The power supply may be disposed within the housing. The lighting system may include at least one battery for energizing the plurality of light-emitting elements. The at least one battery may be disposed within the housing. At least one sensing element may be disposed within and/or on the housing. The at least one sensing element may include or consist essentially of a light sensor, an occupancy sensor, a temperature sensor, a smoke detector, and/or a fire detector. The housing may be in thermal contact with the light sheet and/or the light-emitting elements, whereby the housing is a heat sink for the light sheet and/or the light-emitting elements.

The lighting system may include a second flexible light sheet and a second housing having a three-dimensional, non-planar interior volume. The second light sheet may include or consist essentially of (i) a second flexible substrate having first and second opposed surfaces, (ii) a plurality of second light-emitting elements disposed over at least one of the first or second surfaces of the second substrate, and (iii) a plurality of conductive traces disposed on the second substrate and electrically interconnecting the plurality of second light-emitting elements. When the second light sheet is in an undeformed configuration, (a) the second light sheet may be substantially planar and (b) the second light-emitting elements of the second light sheet may collectively emit light having a third spatial optical characteristic. The second light sheet may be disposed within the interior volume of the second housing. The second light sheet may be deformed to conform to the interior volume of the second housing. The second light-emitting elements of the second light sheet may collectively emit light through the second housing with a fourth spatial optical characteristic different from the third spatial optical characteristic. The first spatial optical characteristic may be the same as the third spatial optical characteristic. The second spatial optical characteristic may be the same as the fourth spatial optical characteristic. The first spatial optical characteristic may be different from the third spatial optical characteristic. The second spatial optical characteristic may be different from the fourth spatial optical characteristic. The light sheet may be electrically coupled to the second light sheet. The housing may be mechanically coupled to the second housing.

The lighting system may include a second flexible light sheet that includes or consists essentially of (i) a second flexible substrate having first and second opposed surfaces, (ii) a plurality of second light-emitting elements disposed over at least one of the first or second surfaces of the second substrate, and (iii) a plurality of conductive traces disposed on the second substrate and electrically interconnecting the plurality of second light-emitting elements. When the second light sheet is in an undeformed configuration, (a) the second light sheet may be substantially planar and (b) the second light-emitting elements of the second light sheet may collectively emit light having a third spatial optical characteristic. The second light sheet may be disposed within the interior volume of the housing. The second light sheet may be deformed to conform to the interior volume of the housing. The second light-emitting elements of the second light sheet may collectively emit light through the housing with a fourth spatial optical characteristic different from the third spatial optical characteristic. The first spatial optical characteristic may be the same as the third spatial optical characteristic. The second spatial optical characteristic may be the same as the fourth spatial optical characteristic. The first spatial optical characteristic may be different from the third spatial optical characteristic. The second spatial optical characteristic may be different from the fourth spatial optical characteristic. The light sheet may be electrically coupled to the second light sheet.

The lighting system may have an ingress protection rating of at least IP 65, as specified by International Protection Marking in International Electrotechnical Commission (IEC) standard 60529. The light sheet may have a thickness in the range of 0.25 mm to 25 mm (inclusive). The light-emitting elements may emit substantially white light. The light-emitting elements may include or consist essentially of light-emitting diodes (e.g., bare-die light-emitting diodes and/or packaged light-emitting diodes). At least a portion of the housing may be transparent to a wavelength of light emitted by the light-emitting elements. At least a portion of the housing may have a transmittance greater than 60% to a wavelength of light emitted by the light-emitting elements. The housing may include or consist essentially of one or more diffusers or diffusing elements. The housing may define one or more optical elements. Each light-emitting element may be associated with, and substantially aligned to, one optical element. The one or more optical elements may include or consist essentially of a refractive optic, a reflecting optic, a total internal reflectance optic, and/or a Fresnel optic. The lighting system may include one or more support structures (e.g., solid support structures) to which the housing is mechanically coupled. The lighting system may be flexible. The lighting system may be positionable, whereby the lighting system maintains a deformed configuration in the absence of a deforming force. A curvature of the light sheet within the housing may be less than a maximum bending tolerance of the light sheet. The substrate may include or consist essentially of polyethylene naphthalate, polyethylene terephthalate, polycarbonate, polyethersulfone, polyester, polyimide, polyethylene, fiberglass, FR4, and/or paper. The conductive traces may include or consist essentially of copper and/or aluminum. The interior volume of the housing may include or consist essentially of at least two portions each having a different curvature. The interior volume of the housing may include or consist essentially of at least two portions each having a different width or diameter.

In another aspect, embodiments of the invention feature a lighting system that includes or consists essentially of a flexible light sheet and a housing having a three-dimensional, non-planar interior volume. The light sheet includes or consists essentially of (i) a flexible substrate having first and second opposed surfaces, (ii) a plurality of light-emitting elements disposed over at least one of the first or second surfaces of the substrate, and (iii) a plurality of conductive traces disposed on the substrate and electrically interconnecting the plurality of light-emitting elements. When the light sheet is in an uncurved configuration, (a) the light sheet is substantially planar and (b) the light-emitting elements of the light sheet collectively emit light having a first luminous intensity distribution. The light sheet is disposed within the interior volume of the housing. The light sheet is curved to conform to the interior volume of the housing, the curvature of the light sheet within the housing being less than a maximum bending tolerance of the light sheet. The light-emitting elements of the light sheet collectively emit light through the housing with a second luminous intensity distribution different from the first luminous intensity distribution.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "about," "approximately," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

Herein, two components such as light-emitting elements and/or optical elements being "aligned" or "associated" with each other may refer to such components being mechanically and/or optically aligned. By "mechanically aligned" is meant coaxial or situated along a parallel axis. By "optically aligned" is meant that at least some light (or other electromagnetic signal) emitted by or passing through one component passes through and/or is emitted by the other. As used herein, the terms "phosphor," "wavelength-conversion material," and "light-conversion material" refer to any material that shifts the wavelength of light striking it and/or that is luminescent, fluorescent, and/or phosphorescent.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 4A is a side view of an illumination system in accordance with various embodiments of the invention;

FIGS. 4B and 4C are side views of the illumination system of FIG. 4A at earlier stages of manufacture;

FIGS. 5 and 6 are schematic views of illumination systems in accordance with various embodiments of the invention;

FIGS. 8A-8E are schematic views of illumination systems in accordance with various embodiments of the invention;

FIG. 11A is a partial circuit diagram of a portion of an illumination system in accordance with various embodiments of the invention;

FIG. 11B is a plan-view schematic of a portion of a light sheet in accordance with various embodiments of the invention;

FIG. 11C is a cross-sectional schematic of the light-sheet portion of FIG. 11B;

FIG. 11D is a cross-sectional schematic of the interior of a housing element in accordance with various embodiments of the invention;

DETAILED DESCRIPTION

Figure 1A:
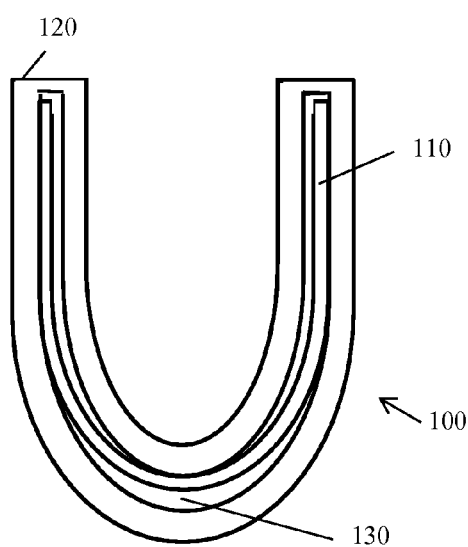
FIGS. 1A and 1B are side views of illumination systems in accordance with various embodiments of the invention.
Figure 1B:
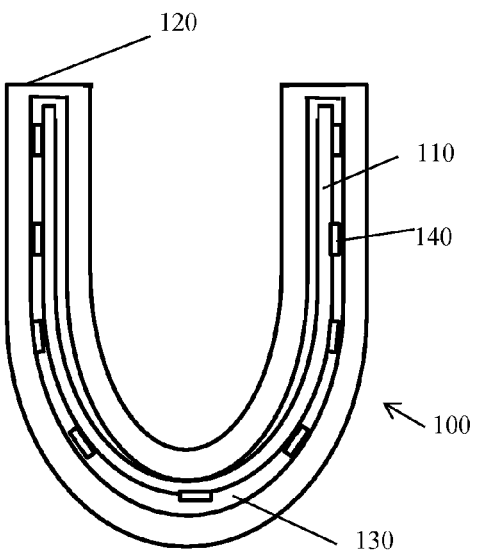
Figure 1C:
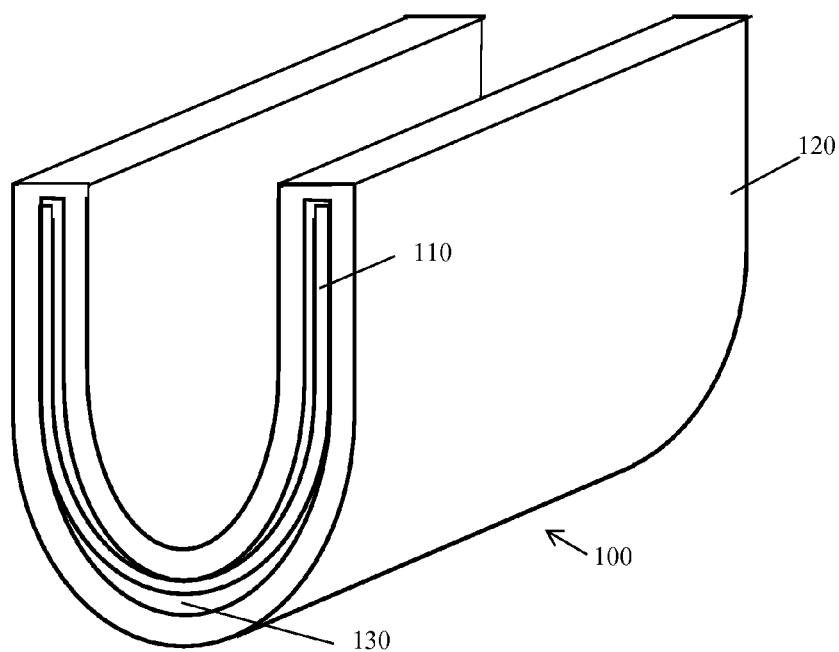
FIG. 1C is a perspective view of the illumination system of FIG. 1A.

FIG. 1A depicts an exemplary lighting device 100 in accordance with embodiments of the present invention, although alternative devices or systems with similar functionality are also within the scope of the invention. As depicted, lighting device 100 includes or consists essentially of one or more flexible light sheets 110 and one or more housing elements 120 having one or more interior regions 130. In some embodiments, light sheets 110 may include an array of light-emitting elements (LEEs) 140, for example as shown in FIG. 1B. FIG. 1C shows an isometric view of the structure of FIG. 1A. In the embodiment shown in FIG. 1C, housing element 120 partially encloses light sheet 110, covering substantially all of the flat face of light sheet 110, but not covering portions of the edges of light sheet 110 (both the visible edge and the back edge not visible in the view of FIG. 1C; see also FIG. 3). In some embodiments, one or more end caps may be included to completely or substantially enclose light sheet 110 in housing element 120. As will be discussed herein, in some embodiments lighting device 100 may include additional elements, for example end caps, connectors, mounting hardware, additional support or decorative structures, power supplies or drivers, sensing elements, control elements or the like.

In various embodiments, housing element 120, also referred to herein as an extrusion, holds or positions flexible light sheet 110 in a specific, pre-determined position or shape in an interior region 130 to achieve one or more specific characteristics or attributes. For example, in some embodiments housing element 120 may hold light sheet 110 in a specific position to achieve a specific light distribution pattern. For example, as shown in FIG. 1A, housing element 120 retains light sheet 110 in a U-shape, resulting in a different light distribution pattern from lighting device 100 than would be achieved using a flat light sheet 110.

In various embodiments, housing element 120 or portions of housing element 120 may be manufactured using an extrusion process (and thus, housing element 120 or portions of housing element 120 may be an "extrusion"). In various embodiments, the extrusion process permits a relatively cost-effective manufacturing method for housing element 120. In various embodiments, an extruded housing element 120 may be transparent to a wavelength of light emitted by LEEs 140 or a portion of housing element 120 may be transparent to a wavelength of light emitted by LEEs 140. In various embodiments, housing element 120 may include one or more optical elements or components (e.g., lenses) thereon, and/or one or more optical elements or components may be defined by the housing element 120 itself. In various embodiments, one or more optical elements may be incorporated into housing element 120 during the extrusion process. For example, one or more linear optical elements may be formed in or as part of housing element 120 in the extrusion direction.

Figure 1D:
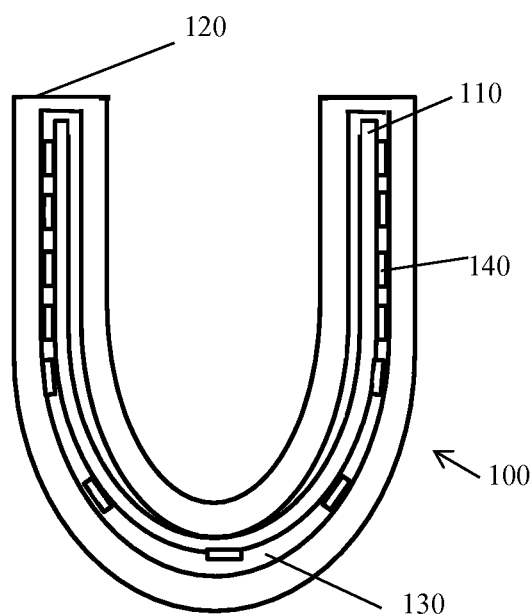
FIG. 1D is a side view of an illumination system in accordance with various embodiments of the invention.

In some embodiments, housing element 120 may hold light sheet 110 in a specific position to achieve a specific thermal profile. For example, in various embodiments, all or a portion of housing element 120 may act as a heat sink for conducting heat away from light sheet 110 and/or LEEs 140. In various embodiments, housing element 120 may be in thermal contact with a portion of light sheet 110 and/or a portion of LEEs 140 and may act as a heat sink for heat generated in light sheet 110 and/or LEEs 140. In various embodiments, heat generated in portions of light sheet 110 and/or LEEs 140 may be distributed over the relatively larger area of housing element 120, thus resulting in a reduced temperature of LEEs 140 and/or light sheet 110. In various embodiments, because housing element 120 has a relatively large area, the temperature of housing element 120 may be relatively lower than the temperature of light sheet 110 and/or LEEs 140 without the use of housing element 120 as a heat sink. In some embodiments, light having different characteristics, for example correlated color temperature (CCT), color rendering index (CRI), angular light distribution pattern, or the like may be emitted from different portions of light sheet 110. In some embodiments, housing element 120 may shape or hold different portions of light sheet 110 in specific positions to achieve specific but different characteristics, e.g., optical characteristics such as light intensity, CCT, CRI, spectral power distribution or the like, in different regions of the light distribution pattern emitted by lighting device 100. As shown in FIG. 1D, portions of light sheet 110 retained within different portions of housing element 120 may have different numbers or areal densities of LEEs 140 thereon in order to achieve different illumination characteristics for light emitted from different portions of the housing element 120.

In some embodiments, housing element 120 may form or hold different portions of light sheet 110 in specific positions to achieve specific but different characteristics, for example thermal characteristics such as temperature or thermal resistance or the like in different regions of housing element 120 and/or lighting device 100.

Figure 2A:
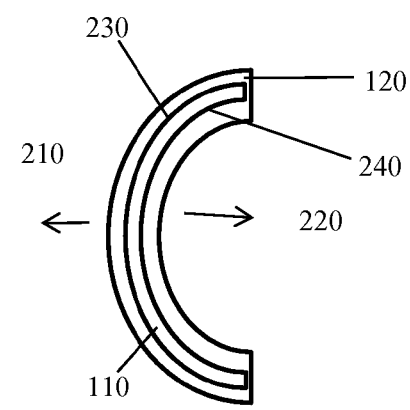
FIGS. 2A-2C are side views of illumination systems in accordance with various embodiments of the invention.
Figure 2B:
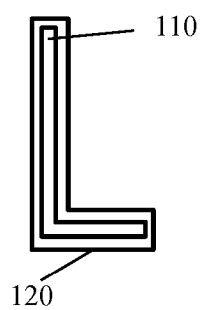
Figure 2C:
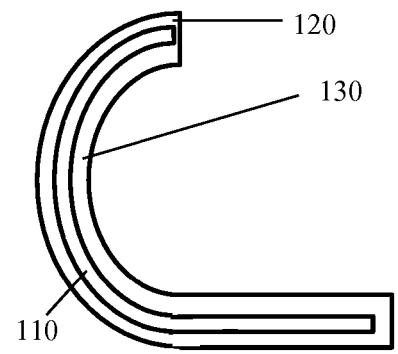

While in FIGS. 1A-1D, housing element 120 has a U-shape, this is not a limitation of the present invention, and in other embodiments housing element 120 may have a different curved shape, or may include one or more straight portions, or a combination of straight and curved portions, or may have any arbitrary shape. FIG. 2A depicts an embodiment having a curved housing element 120 enclosing light sheet 110. In some embodiments, light from light sheet 110 may be emitted from one side of light sheet 110, for example the side identified as side 230, generally in a direction 210, while in other embodiments, light from light sheet 110 may be emitted from a different or opposite side of light sheet 110, for example the side identified as side 240, generally in a direction 220 (i.e., generally opposite direction 210). FIG. 2B depicts an embodiment in which housing element 120 includes substantially straight or planar portions, for example having an L shape. The shape of housing 110 shown in FIG. 2B is not a limitation of the present invention, and in other embodiments housing 110 may have other shapes including or consisting essentially of two or more planar sections, or one or more planar sections and one or more curved sections. FIG. 2C depicts an embodiment in which housing element 120 includes both substantially curved and substantially straight or planar portions.

Figure 3:
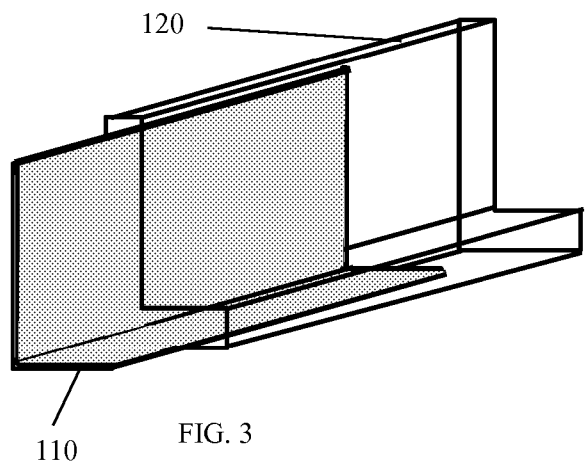
FIG. 3 is a perspective view of an illumination system in accordance with various embodiments of the invention.

In some embodiments, housing element 120 is constructed such that interior region 130 is only accessible through one or both of the ends of housing element 120. For example, as depicted in FIG. 3, one or more light sheets 110 must be inserted into interior region 130 of housing element 120 via one or both of the ends of housing element 120. In other words, in some embodiments the portions of housing element 120 that are adjacent to or in contact with LEEs 140, the surface of light sheet 110 on which LEEs 140 are disposed, or the side of light sheet 110 opposite that on which LEEs 140 are disposed do not move or open to permit placement of light sheet 110 in housing element 120. In some embodiments, portions of interior region 130 may be formed from one non-separable portion of housing element 120.

In various embodiments of the present invention, light sheet 110 may curved into shape to fit within housing element 120, while in other embodiments light sheet 110 may include one or more folds or creases. For example, in the lighting systems of FIG. 2B and FIG. 3, light sheet 110 may be folded or creased to fit into the L-shaped housing element 120.

In some embodiments, one or more portions of housing element 120 that are adjacent to or in contact with the surfaces of LEEs 140, light sheet 110 on which LEEs 140 are disposed, or the side of light sheet 110 opposite that on which LEEs 140 are disposed may move or open to permit placement of light sheet 110 in housing element 120, or placement of light sheet 110 in interior region 130 in housing element 120. For example, in one embodiment portions of interior region 130 may be formed by two or more separable portions of housing element 120. FIG. 4A shows one example of an embodiment of the present invention showing a separable clam-shell-type housing element 120 that features housing element portions 120' and 120". In one embodiment, light sheet 110 may be placed in between housing element portions 120; and 120'; as shown in FIG. 4B, during the assembly process. Housing element portions 120; and 120'; are then brought together and mated together to form a housing element 120. During this process, light sheet 110 deforms to substantially conform to the interior shape of interior region 130, as shown in FIG. 4C, resulting in the structure of FIG. 4A. In some embodiments, light sheet 110 may already be shaped to substantially conform to the interior shape of interior region 130, and thus may not deform substantially during assembly of housing element portions 120' and 120".

FIGS. 1A-4C show various geometries for lighting devices 100 and housing elements 120; however, these are not limitations of the present invention, and in other embodiments lighting device 100 and housing element 120 may have any shape or geometry. While FIGS. 4A-4C show housing 120 composed of two housing element portions, this is not a limitation of the present invention, and in other embodiments housing element 120 may be composed of more than two housing element portions.

In some embodiments, lighting device 100 may be configured to protect light sheet 110, for example to provide mechanical protection, protection from dust, water, etc. One method for rating different levels of environmental protection is an IP rating as specified by International Protection Marking in IEC standard 60529, providing classification of degrees of protection provided by enclosures for electrical equipment, the entirety of which is hereby incorporated by reference herein. In some embodiments, lighting device 100 may have any IP rating, for example from IP00 to IP 69k, or any other IP rating. In some embodiments, lighting device 100 has an IP 65 rating or an IP 66 rating or an IP 67 rating or an IP 68 rating. In general for an IP XY rating, "X" indicates the level of protection for access to electrical parts and ingress to solid foreign objects, while "Y" indicates the level of protection for ingress of harmful water. For example, an IP44 rating provides access and ingress protection for objects greater than about 1 mm and protection from water splashing on the system. In another example, an IP66 rating provides a dust-tight enclosure and protection from water jets incident on the system. Specific details of the requirements and test method are detailed within the IP specification.

In some embodiments, housing element 120 may have an end cap or closure on one or both ends of housing element 120. FIG. 5 shows one example of an embodiment of an end cap 510. In some embodiments, end cap 510 may be removable, for example it may be affixed to housing element 120 or lighting device 100 using a reversible closure, e.g., a press-fit end cap, a threaded end cap, screws, bolts, removable or reversible adhesive, or the like. In some embodiments, end cap 510 may be substantially permanently affixed to housing element 110 or lighting device 100; that is, it may be affixed in a manner not meant to be removed during normal operation or maintenance. In some embodiments, end cap 510 may be sealed to housing element 110 or lighting device 100 using an o-ring seal. In some embodiments, an o-ring seal may be removable during normal operation and maintenance, while in other embodiments an o-ring seal may be designed not to be removed during normal operation and maintenance. In some embodiments, end cap 510 may be affixed to housing element 110 or lighting device 100 using, for example, glue, adhesive, tape, room temperature vulcanization (RTV) silicone, rivets, UV-curable adhesive, or the like.

In some embodiments, two housing elements 110 may be joined or coupled together, for example to make a longer lighting device 600, using a connector 610, as shown in FIG. 6. As discussed herein, in some embodiments connector 610 may be removable, for example, a press-fit end cap, a threaded end cap, screws, bolts, or the like, while in other embodiments connector 610 may be designed to be permanently installed, i.e., to not be removed during normal operation and maintenance. As discussed herein, connector 610 may be coupled to housing elements 120 using a variety of permanent means, for example glue, adhesive, tape, RTV silicone, screws, rivets, or the like. While FIG. 6 shows two housing elements 120 coupled together, this is not a limitation of the present invention, and in other embodiments more than two housing elements 120 may be joined or coupled together via, e.g., the use of multiple connectors 610.

In some embodiments, connector 610 may be designed to connect two portions of lighting device 100 such that the distance between adjacent LEEs 140 across the joint between the two portions of lighting device 100, or two portions of light sheet 110, is the same as or substantially the same as that between adjacent LEEs 140 on each light sheet 110. The ability to position or join multiple lighting devices 100 provides a system that may be utilized to make arbitrarily large assemblies having uniform luminance with no relatively darker areas in the joint regions between adjacent lighting devices 100.

In various embodiments, connector 610 may include or consist essentially of a mechanical connector joining two housing elements 120 together; however, this is not a limitation of the present invention, and in other embodiments connector 610 may include other or additional functionality, for example, electrical coupling between portions of light sheet 110, between portions of lighting devices 100, or the like. In various embodiments, electrical coupling may be utilized to provide energization or power to light sheets 110 and/or to provide control and/or communication to and between light sheets 110.

In some embodiments, lighting device 100 incorporates a driver or power supply to provide power to light sheet 110. In some embodiments, lighting device 100 is configured to receive one or more control or communication signals, for example to energize or de-energize light sheet 110, to dim or increase the intensity of light emitted by light sheet 110, and/or to change one or more characteristics of light emitted by lighting device 100, for example the CCT, CRI, and/or the light distribution pattern of the light emitted by light sheet 110. In some embodiments, lighting device 100 may include more than one light sheet 110, and in some such embodiments control or communication signals may provide different information or signals to different light sheets 110. In some embodiments, different information or signals may be provided to different portions of one light sheet 110.

Figure 7A:
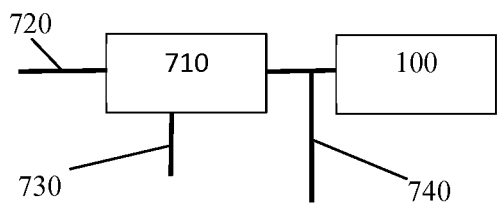
FIGS. 7A and 7B are schematic views of illumination systems in accordance with various embodiments of the invention.

In some embodiments, a power supply and/or driver 710 may be separate from lighting device 100, as depicted schematically in FIG. 7A. FIG. 7A shows power supply/driver 710 providing power to lighting device 100. Power is supplied to power supply/driver 710 through a connection 720 (e.g., one or more wires or other electrical conductors). Communication and control signals may be provided to power supply driver 710, for example by connection 730, or to lighting device 100, for example by connection 740. In some embodiments, connections 720, 730, and 740 are wired, that is are formed using a physical connection; however, this is not a limitation of the present invention, and in other embodiments connections 720, 730, and/or 740 may be provided by other means, for example wirelessly, for example using wireless power transfer, light-based communication, radio-based communication, Wi-Fi, Bluetooth, infrared light, ultraviolet light, or the like.

Figure 7B:
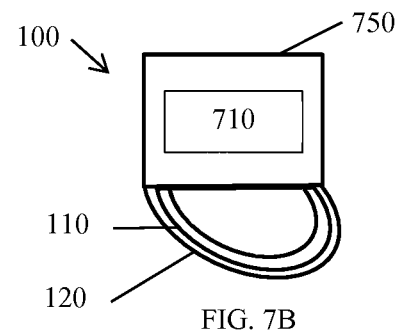

In some embodiments, driver 710 may be physically incorporated into lighting device 100. For example, in some embodiments driver 710 may be incorporated into lighting device 100 as depicted in the cross-section schematic shown in FIG. 7B. While FIG. 7B shows driver 710 in a support structure 750, this is not a limitation of the present invention, and in other embodiments driver 710 may be inside interior region 130.

In some embodiments, where driver 710 is separate from lighting device 100 or where driver 710 is not inside interior region 130, electrical connection to light sheet 110 may be made through a portion of housing element 120 or through end cap 510 or through connector 610. In some embodiments where driver 710 is inside interior region 130, electrical connection between driver 710 and light sheet 110 may be completely contained within interior region 130, while electrical connection to driver 710 may be made through a portion of housing element 120 or through end cap 610 or through connector 710.

In some embodiments, a lighting device 100 may be battery powered. In some aspects of such embodiments, one or more batteries may be contained within interior region 130 or inside lighting device 100 but not inside interior region 130, for example similar to the device shown in FIG. 7B, but with driver 710 replaced by a battery and optional driver. Alternatively, one or more batteries may be external to lighting device 100. In some embodiments, a battery-operated lighting device may have an IP rating, for example an IP 65 rating, an IP 66 rating, an IP 67 rating, or an IP 68 rating. In some embodiments, a battery-operated lighting device may incorporate a non-rechargeable or a rechargeable battery source to power light sheet 110. In some embodiments, a battery-operated lighting device may incorporate a rechargeable battery capable of being charged wirelessly, for example inductively. In various embodiments, a battery-operated lighting device may incorporate or be connectable to one or more photovoltaic cells, batteries, generators, energy harvesting devices, or the like.

In some embodiments of the present invention, two or more lighting devices 100 may be electrically coupled together, or one or more lighting devices 100 may be electrically coupled to one or more drivers or power supplies, such as driver 710. In some embodiments, control or communication signals may be required to be supplied to lighting device 100, driver 710, and/or light sheet 110. In some embodiments of the present invention, control or communication signals may be supplied through direct coupling (i.e., wired or physical electrical coupling), through an electrical connector, optically, wirelessly, by induction, or by other means, as discussed herein.

In some embodiments, end cap 510 and/or connector 610 may include a means for electrically coupling two or more lighting devices 100, or coupling one or more lighting devices 100 to one or more drivers 710, or to provide control and/or communications signals to lighting device 100, for example to light sheet 110 and/or driver 710. For example, in one embodiment end cap 510 and/or connector 610 may include one or more electrical connectors, such as a pin-and-jack system, whereby adjacent light sheets 110 are electrically coupled through the electrical connector. For example, in one embodiment connector 610 may feature a connector electrically coupled to one or more power conductors on light sheet 110, and the connector may be electrically coupled to a corresponding connector on an adjacent light sheet 110 through connector 610. In one embodiment, connector 610 permits physical close coupling of adjacent lighting devices 100, while in other embodiments a jumper wire may be used to electrically couple two or more spaced-apart lighting devices 100. In some embodiments, wires may be soldered or otherwise electrically coupled to power conductors 910, 920 (as discussed with reference to FIGS. 9A-9C) and multiple lighting devices 100 may be electrically coupled through standard wiring techniques, for example using connectors, wire nuts, soldering, or the like. In one embodiment, magnets of the appropriate polarity may be mounted or disposed within or at the ends of housing elements 120 or within end cap 510 and/or connector 610, such that each frame may be mechanically and electrically connected via the magnets. In other embodiments of the present invention, other means may be used for electrically coupling two or more lighting devices 100 or coupling one or more lighting devices 100 to one or more drivers 710, or to provide control and/or communications signals to lighting device 100, for example using radio-based signals or light-based signals.

FIG. 7B depicts another aspect of embodiments of the present invention. In FIGS. 1A-6 housing element 120 has been depicted as being symmetric or substantially symmetric. However, this is not a limitation of the present invention, and in other embodiments housing element 120 may be asymmetric in one or more dimensions While various ones of FIGS. 1A-6 show lighting device 100 as straight, this is not a limitation of the present invention, and in other embodiments the lighting device may be curved or have multiple straight segments or have any shape. FIGS. 8A-8E depict various non-limiting geometries of lighting devices of the present invention. FIG. 8A depicts a lighting system having a curved housing element 120. In some embodiments, the light distribution pattern of lighting device 100 may be controlled by both a curved or shaped light sheet 110 (identified by the dashed line in FIG. 8A) and a curved or shaped housing element 120. FIG. 8B depicts another embodiment of a lighting device of the present invention. In one embodiment, the lighting device of FIG. 8B may be mounted at the intersection of two planar surfaces, for example a ceiling and wall. While FIG. 8B shows a structure that is about 25% of a full circle, this is not a limitation of the present invention, and in other embodiments the lighting device may be any portion of a full circle.

FIG. 8C depicts an embodiment of the present invention in which light sheet 110 (identified by the dashed line in FIG. 8C) has a varying width along the length of housing element 120. Housing element 120 and interior space 130 vary in a similar fashion as the width of light sheet 110, such that light sheet 110 is held in place along housing element 120. In some embodiments of this lighting device, this may permit varying of the light intensity and/or light distribution pattern in different directions. For example, in one embodiment of the lighting device of FIG. 8C, the light intensity may be greater in direction 810 than in direction 820. In one embodiment of the lighting device of FIG. 8C, the light distribution pattern may be wider in direction 810 than in direction 820. FIGS. 8D and 8E show additional illustrative, non-limiting embodiments.

In some embodiments, lighting device 100 may be flexible in the sense of being pliant in response to a force and resilient, i.e., tending to elastically resume an original configuration upon removal of the force. Such lighting devices may have a radius of curvature of about 50 cm or less, or about 20 cm or less, or about 5 cm or less, or about 1 cm or less. In some embodiments, housing elements 120 have a Young's Modulus less than about $50 \times 10^9$ N/m², less than about $10 \times 10^9$ N/m², or even less than about $5 \times 10^9$ N/m². In some embodiments, housing elements 120 have a Shore A hardness value less than about 100; a Shore D hardness less than about 100; and/or a Rockwell hardness less than about 150.

In some embodiments, lighting device 100 is positionable, in the sense that it is pliant in response to a force, as with a flexible element, but that the element substantially retains the deformed shape upon removal of the force. Such lighting devices may have essentially any radius of curvature, but in particular may have a radius of curvature of about 50 cm or less, or about 20 cm or less, or about 5 cm or less, or about 1 cm or less.

In some embodiments, lighting device 100 and/or housing element 120 may be rigid or substantially rigid, in the sense that they are not pliant in response to a force, i.e., tending to plastically deform or break in response to a force.

In some embodiments, lighting device 100 and/or housing element 120 are semi-rigid, having a deformation characteristic between that of a flexible element and a rigid or substantially rigid element. Such elements may have a radius of curvature greater than about 1 cm.

In some embodiments, light sheet 110 typically includes or consists essentially of an array of LEEs 140 electrically coupled by conductive elements formed on a flexible substrate, for example as described in U.S. patent application Ser. No. 13/799,807, filed Mar. 13, 2013 (the '807 application), or U.S. patent application Ser. No. 13/970,027, filed Aug. 19, 2013 (the '027 application), the entire disclosure of each of which is herein hereby incorporated by reference.

Figure 9A:
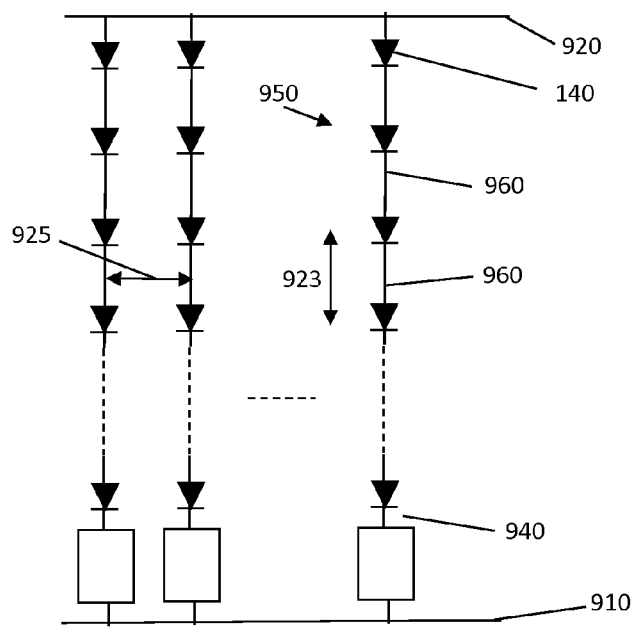
FIG. 9A is a circuit diagram of a light sheet in accordance with various embodiments of the invention.

FIG. 9A depicts an exemplary circuit topology, in accordance with embodiments of the present invention, which features conductive elements 960, at least two power conductors 910, 920, multiple LEEs 140, and optional control elements (CEs) 940. In some embodiments, LEEs 140 may be configured in a regular periodic array, for example a substantially square or rectangular array, where LEEs 140 are separated by pitch (or "spacing") 923 in the one direction (for example vertical direction) by pitch 925 in a substantially orthogonal direction. In some embodiments, pitch 925 is the same as or substantially the same as pitch 923. While the geometrical layout and pitches 923 and 925 are described in connection with the circuit schematic shown in FIG. 9A, such geometry, layout, and pitches are not limitations of the present invention, and in other embodiments the physical layout of the circuit elements may be different than the circuit topology shown in FIG. 9A. Additionally, other embodiments may have different circuit topologies, for example LEEs 140 may be electrically coupled in parallel, in a combination of series and parallel, or any other arrangement. In some embodiments, more than one group of electrically connected LEEs 140 may be electrically coupled to one CE 940, while other embodiments may not require any CEs 140. The specific circuit topology is not a limitation of the present invention.

FIG. 9A shows two power conductors 910 and 920, which may be used to provide power to strings 950 of LEEs 140. Each string 950 may include two or more electrically coupled LEEs 140. LEEs 140 in string 950 may be electrically coupled in series, as shown in FIG. 9A; however, this is not a limitation of the present invention, and in other embodiments other examples of electrical coupling may be utilized, for example LEEs in parallel or in any combination of series and parallel connections. FIG. 9A shows CE 940 connected in series with LEEs 140 of string 950; however, this is not a limitation of the present invention, and in other embodiments CE 940 may have different electrical coupling between power conductors 910, 920, or may be absent altogether. For example, in some embodiments CE 940 may be separately electrically coupled to power conductors 910, 920 and to the LEE string 950, while in other embodiments each CE 940 may be electrically coupled to two or more strings. The number of strings electrically coupled to each CE 940 is not a limitation of the present invention. Combinations of structures described herein, as well as other electrical connections, all fall within the scope of the present invention. Power conductors 910, 920 may be used to provide power to strings 950, for example AC power, DC power, or power modulated in any other fashion.

Figure 9B:
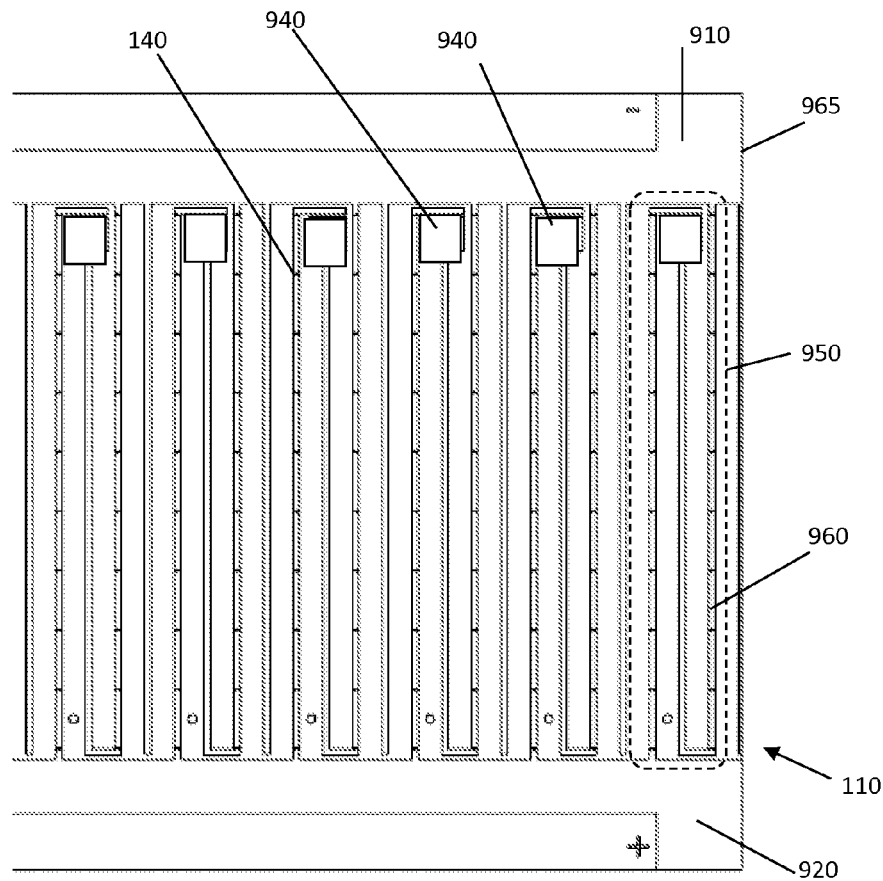
FIGS. 9B and 9C are schematics of a portion of a light sheet in accordance with various embodiments of the invention.
Figure 9C:
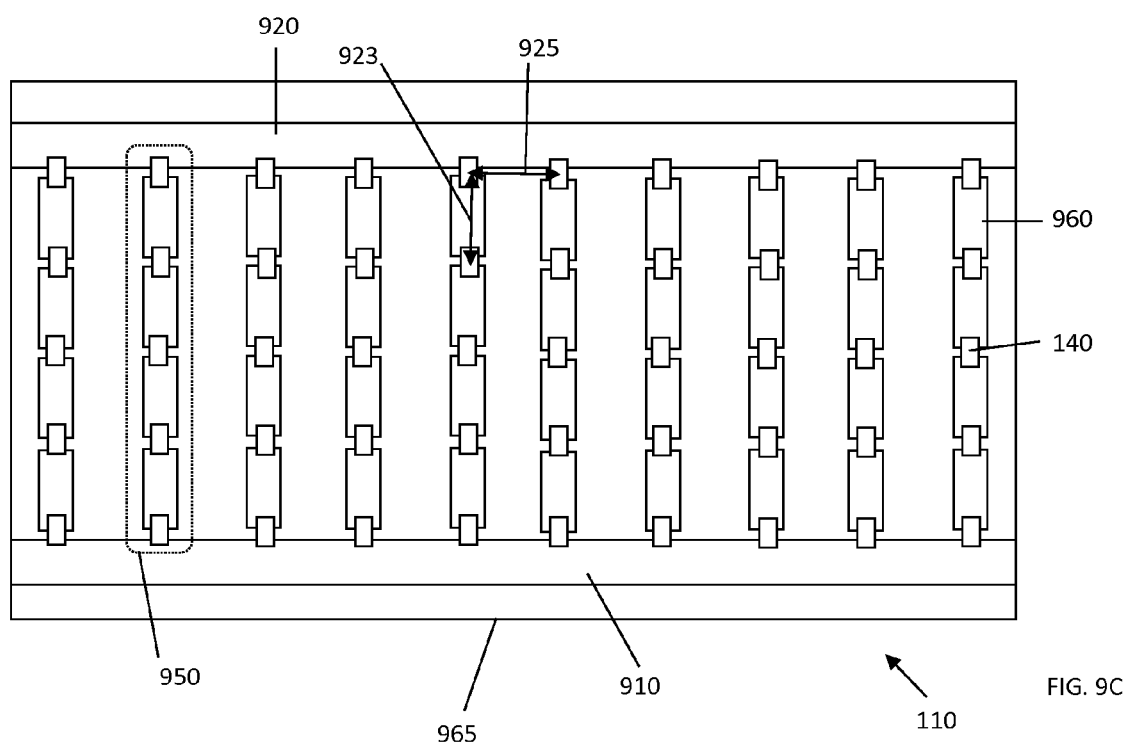

Referring to FIGS. 9B and 9C that depict schematics of exemplary light sheets 110, a light sheet 110 may feature an array of LEEs 140 each electrically coupled between conductive traces 960, and power conductors 910 and 920 providing power to conductive traces 960 and CEs 940, all of which are disposed over a substrate 965. As utilized herein, a "wiring board" refers to a substrate for LEEs with or without additional elements such as conductive traces or CEs. A wiring board may also be referred to as a light sheet or a circuit board. FIG. 9B shows a portion of light sheet 110. In the exemplary embodiment depicted in FIG. 9B, power conductors 910, 920 are spaced apart from each other and light-emitting strings (or simply "strings") 950 are connected in parallel across power conductors 910, 920. In some embodiments, for example as shown in FIG. 9B, strings 950 do not cross (i.e., intersect) each other. In other words, power conductors 910, 920 are oriented in one direction and strings 950 are oriented such that they span power conductors 910, 920 in a different direction. As shown in FIG. 9B, strings 950 are substantially perpendicular to power conductors 910, 920. However, this is not a limitation of the present invention, and in other embodiments at least some segments (i.e., portions connecting two or more LEEs 140), or even the entire strings 950, may define a line (not necessarily a straight line) that is not perpendicular to power conductors 910, 920 yet is (at least for an entire string 950) not parallel to power conductors 910, 920. In other embodiments strings 950 may intersect, for example one string 950 splitting into two or more strings 950, or two or more strings 950 joining to form a reduced number of strings 950. In some embodiments, conductive traces 960 may cross over each other without being electrically coupled, and in some embodiments strings 950 may cross over or under each other without being electrically coupled (e.g., they may be electrically insulated from each other). In some embodiments all or a portion of one or more strings 950 may be outside of the area spanned by power conductors 910, 920. Various examples of string geometries and conformations utilized in embodiments of the present invention are detailed in the '807 and '027 applications.

As shown, LEEs 140 are positioned across substrate 965 in a regular periodic array, although this is not a limitation of the present invention, and in other embodiments LEEs 140 may occupy any positions on light sheet 110. Power conductors 910 and 920 provide power to each LEE string, for example the string 950 encircled by the dashed line in FIG. 9B. Each LEE string 950 typically includes multiple conductive traces 960 that interconnect multiple LEEs 140, as well as one or more CEs 940, which in FIG. 9B is in series with LEEs 140. String 950 shown in FIG. 9B is a folded string, i.e., a string that has three segments electrically coupled in series but positioned as three adjacent segments. A string segment is a portion of a string spanning all or a portion of the region between power conductors 910 and 920 in FIG. 9B. In light sheet 110, some string segments may include LEEs 140 while others do not. However, in other embodiments the distribution and position of LEEs 140 along conductive elements 960 and string segments may be different. In some embodiments, a string 950 may be a straight string, i.e., a string with no folds, as shown in FIG. 9C. (For simplicity, the example shown in FIG. 9C does not depict CEs 940). One end of string 950 is electrically coupled to power conductor 910, while the other end of string 950 is electrically coupled to power conductor 920. As will be discussed, the number of segments in a string 950 is not a limitation of the present invention. Various examples of straight and folded strings utilized in embodiments of the present invention are detailed in the '807 and '027 applications.

FIGS. 9A and 9B illustrate three aspects in accordance with various embodiments of the present invention. The first is the multiple strings 950 that are powered by the set of power conductors 910, 920. The second is the positional relationship between the locations of LEEs 140 and CE 940, which is disposed between the conductive traces 960 and between power conductors 910, 920. The third is the inclusion of a CE 940 in each string of series-connected LEEs 140. Combinations of these three aspects enable light sheet 110 to be economically manufactured in very long lengths, for example in a roll-to-roll process, and cut to specified lengths, forming light sheets, while maintaining the ability to tile, or place light sheets adjacent to each other (e.g., in the length direction), with no or substantially no change in pitch between LEEs 140 or in the optical characteristics across the joint between two adjacent light sheets, as discussed in more detail in the '807 and '027 applications.

In an exemplary embodiment, CE 940 is configured to maintain a constant or substantially constant current through LEEs 140 of string 950. For example, in some embodiments, a constant voltage may be applied to power conductors 910, 920, which may, under certain circumstances may have some variation, or the sum of the forward voltages of LEEs 140 in different strings may be somewhat different, for example as a result of manufacturing tolerances, or the component and/or operational values of the element(s) within CE 940 may vary, for example as a result of manufacturing tolerances or changes in operating temperature, and CE 940 acts to maintain the current through LEEs 140 substantially constant in the face of these variations. In other words, in some embodiments the input to the light sheet is a constant voltage that is applied to power conductors 910, 920, and CEs 940 regulate the current in each string to which it is connected, e.g., regulate the current to a constant or substantially constant current through LEEs 140. The design of CE 940 may be varied to provide different levels of control or variation of the current through LEEs 140. In some embodiments, CEs 940 may control the current through LEEs 140 to be substantially constant with a variation of less than about ±25%. In some embodiments, CEs 940 may control the current through LEEs 140 to be substantially constant with a variation of less than about ±15%. In some embodiments, CEs 940 may control the current through LEEs 140 to be substantially constant with a variation of less than about ±10%. In some embodiments, CEs 940 may control the current through LEEs 140 to be substantially constant with a variation of less than about ±5%.

In some embodiments, CEs 940 may, in response to a control signal, act to maintain a constant or substantially constant current through LEEs 140 until instructed to change to a different constant or substantially constant current, for example by an external control signal. In some embodiments, as detailed herein, all CEs 940 on a sheet may act in concert, that is maintain or change the current through all associated LEEs 140; however, this is not a limitation of the present invention, and in other embodiments one or more CEs 940 may be individually instructed and/or energized.

In some embodiments LEEs 140 may include or consist essentially of light-emitting diodes (LEDs) or lasers. In some embodiments, light emitted from light sheet 110 is in the form of an array of bright spots, or light-emission points, resulting in a pixelated pattern. However, this is not a limitation of the present invention, and in other embodiments light sheet 110 includes different types of light emitters, for example organic LEDs (OLEDs). In some embodiments, light sheet 110 may emit light homogeneously or substantially homogeneously, for example light sheet 110 may include an array of LEEs 140 behind an optic or diffuser that spreads the light from LEEs 140 homogeneously or substantially homogeneously. In some embodiments, light sheet 110 may include one or more OLEDs emitting homogeneously or substantially homogeneously over light sheet 110.

In the embodiment depicted in FIG. 9B, LEEs 140 are distributed substantially uniformly over light sheet 110; however, this is not a limitation of the present invention, and in other embodiments, LEEs 140 may have a non-uniform distribution, for example as shown in FIG. 1D, where the structure has a higher density of LEEs 140 on the vertical portion of light sheet 120, for example to increase the light intensity in the lateral direction. As will be understood, the distributions of LEE 140 on light sheet 110 shown in FIG. 9B or FIG. 1D are not limitations of the present invention, and other embodiments may have other distributions of LEEs 140. In some embodiments, one or more portions of light sheet 110 may be unpopulated with LEEs 140. In some embodiments, the distribution of LEEs 140 on light sheet 110 is specifically chosen to achieve one or more characteristics, for example optical, electrical, thermal or the like, as described herein. In some embodiments, the distribution of LEEs 140 on light sheet 110 may be chosen to create a certain desired decorative look.

As described herein, lighting device 100 may be designed to be cut to length. In some embodiments, lighting device 100 is cut to length with light sheet 110 installed; however, in other embodiments the housing element 120 may be cut to length before incorporation or installation of light sheet 110. In some embodiments, light sheet 110 may also be cut to length, as discussed in more detail in the '807 and '027 applications. For example, in some embodiments of the present invention light sheet 110 may be cut between strings 950.

In some embodiments, light sheet 110 does not require any additional thermal management or heat-sinking, i.e., the heat generated by LEEs 140 is at least partially accommodated by the structure of light sheet 110 itself, for example substrate 965 and/or conductive elements 960 and/or power conductors 910, 920. In some embodiments, light sheet 110 may be incorporated into housing element 120 without the need for additional passive or active cooling of light sheet 110. In some embodiments, housing element 120 may include or consist essentially of a wide range of materials without the need for a relatively high thermal conductivity to aid in heat extraction from light sheet 110. For example, in some embodiments all or portions of housing element 120 may include or consist essentially of one or more of the following materials: plastic, acrylic, polycarbonate, glass, silicone, polyurethane, wood, fabric, or the like. In some embodiments, housing element 120 may have a thermal conductivity less than about 5 W/·K, less than about 2 W/m·K, less than about 1 W/m·K, or even less than 0.5 W/m·K. In some embodiments, portions of housing element 120 in contact with LEEs 140 may have a thermal conductivity less than about 5 W/m·K, less than about 2 W/m·K, less than about 1 W/m·K, or even less than 0.5 W/m·K. In some embodiments, portions of housing element 120 adjacent to or in contact with light sheet 110 may have a thermal conductivity less than about 5 W/m·K, less than about 2 W/m·K, less than about 1 W/m·K, or even less than 0.5 W/m·K. In some embodiments, all or portions of housing element 120 may include or consist essentially of a metal, for example aluminum, copper, steel, brass, or the like.

In various embodiments, lighting device 100 may be mounted (e.g., to a mounting surface such as a wall, a ceiling, or a fixture), for example using screws or nails (or other fasteners) that may be inserted through mounting holes defined by and/or extending at least partially through housing 120; however, this is not a limitation of the present invention, and in other embodiments lighting device 100 may be mounted by other means, for example staples, tape, double-sided tape, magnets, a hook-and-loop fastener such as Velcro, or the like. In various embodiments, lighting device 100 may include or incorporate mounting elements, for example double-sided tape or barbed pins that may be used to mount lighting device 100 to a mounting surface. In some embodiments, lighting device 100 may be suspended from a surface, for example a roof or ceiling. In various embodiments, housing elements 120 may include mounting hardware, for example, wall anchors, hooks, pre-installed screws, eyelets, magnets, tape, adhesive, hook-and-loop fasteners such as Velcro, and/or holes for mechanical fasteners such as nails or screws, and the like, to aid in installation of lighting device 100.

Figure 10:
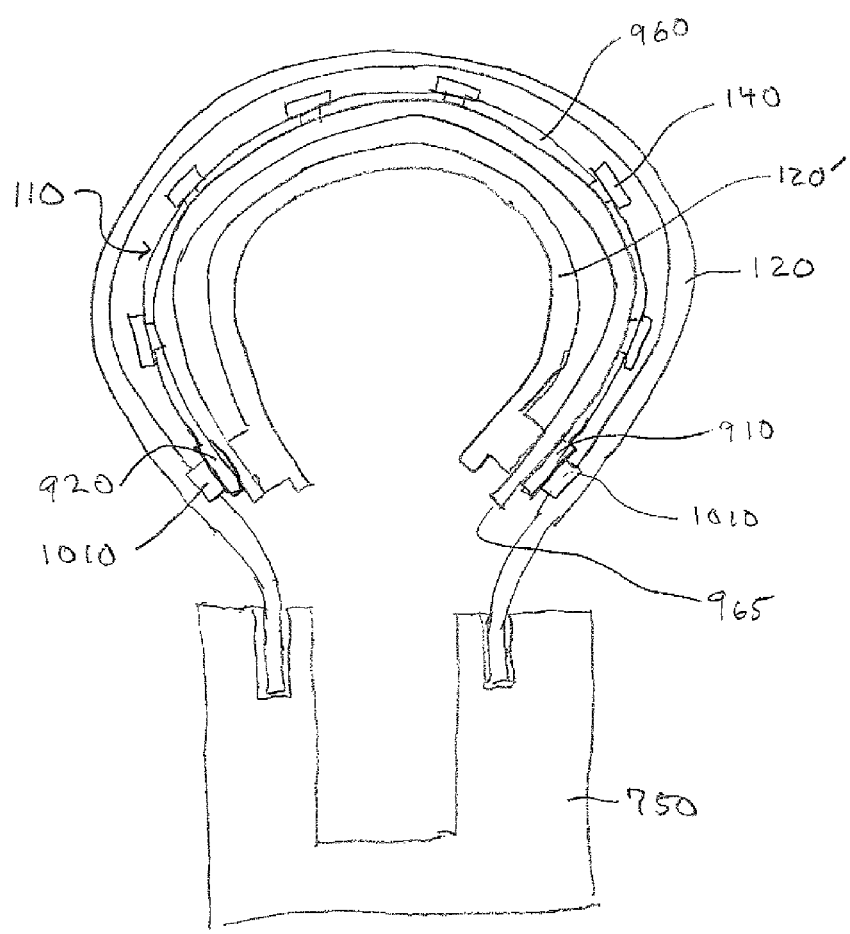
FIG. 10 is a schematic view of an illumination system in accordance with various embodiments of the invention.

In some embodiments, one or more electrical conductors may be incorporated into housing element 120, for example to provide power and/or communication and/or control signals to light sheet 110. For example, in one embodiment housing element 120 features a conductive element 1010 that is disposed on or formed within or embedded or partially embedded into housing element 120. FIG. 10 shows conductive elements 1010 disposed on exterior housing element 120 or between exterior housing element 120 and light sheet 110 and electrically coupled to power conductors 910, 920 on light sheet 110. As shown in FIG. 10, power conductors 910, 920 are electrically coupled to conductive elements 960, which are electrically coupled to LEEs 140. Light sheet 110 is clamped between interior housing element portion 120' and exterior housing element portion 120, forming an electrical and mechanical connection between conductive elements 1010 and power conductors 910, 920. In some embodiments, conductive element 1010 may be mounted on a surface (e.g., an external surface) of housing element 120. In various embodiments, conductive element 1010 includes or consists essentially of one or more electrically conductive materials such as metals such as aluminum, copper, silver, gold, steel, or the like. In various embodiments, conductive element 1010 includes an electrically conductive tape, for example one that is conductive in both the lateral and z (i.e., through-thickness) directions, such that a low-resistance pathway forms between power conductor 910 and conductive element 1010, and conductive element 1010 forms a low-resistance pathway in parallel with power conductor 910. In some embodiments, conductive element 1010 includes or consists essentially of a combination of materials, for example a metal layer over which is formed a conductive adhesive or a conductive tape. In various embodiments, a pin, a rivet, or a barbed pin electrically coupled to conductive element 1010 and disposed on or within housing element 120 may pierce and electrically couple to a conductive trace on light sheet 110. In various embodiments, a pin or a barbed pin electrically coupled to a conductive trace on light sheet 110 may pierce and electrically couple to a conductive element 1010.

In some embodiments, housing element 120 may include more than one conductive element 1010. For example, conductive elements in housing element 120 may be used, in addition to powering lighting device 100, to provide communication and control signals to and from lighting device 100. In some embodiments, conductive elements in housing 120 may be used to provide electrical crossovers, to permit additional circuitry complexity while still using only one layer of conductive elements 960 on substrate 965. For example, FIG. 11A shows an electrical schematic of a system having two different types of LEEs 140, 140'. In some embodiments, LEE 140 may have a different color than LEE 140', or a different intensity, or a different light distribution pattern, or a difference in any other electrical and/or optical properties. In one embodiment, LEE 140 and 140' may both emit white light, but with different color temperatures, and the color temperature of the light panel may be adjusted by changing the light intensity emitted by strings with different color-temperature LEEs. For example in various embodiments LEEs 140 may have a correlated color temperature (CCT) of about 2000K and LEEs 140' may have a CCT of about 10,000K and the CCT of the ensemble may be varied between about 2000K and about 10,000K by varying the power delivered to strings having LEEs 140 and 140'. In various embodiments, LEEs 140 may have a CCT of about 2700K, and LEEs 140' may have a CCT of about 5000K, and the CCT of the ensemble may be varied between about 2700K and about 5000K by varying the power delivered to strings having LEEs 140 and 140'.

In various embodiments, the circuit is driven by a substantially constant voltage supply that is pulse-width modulated, that is, the voltage is kept substantially the same during the "on" phase, and the light intensity is varied by changing the duty cycle, or the ratio of "on" to "off" time of the power signal. The circuit of FIG. 11A typically requires the power to the two different types of strings to be modulated separately, and thus typically requires three, or perhaps four (if separate returns are required) conductors. As understood by those skilled in the art, this requires an electrical cross-over or a similar electrical routing scheme. While light sheets with multiple conductive layers may be manufactured, these are relatively more expensive than light sheets or circuit boards with one layer of conductive elements. In various embodiments of the present invention, conductive elements within housing element 120 may form one or more electrical cross-overs, permitting circuits such as that shown in FIG. 11A to be realized with a light sheet or circuit board having only one conductive layer.

FIG. 11B shows one example of a pattern of power conductor traces for power conductors 920 and 920' on light sheet 110, that, combined with the housing element 120, permit realization of circuits requiring crossovers with a light sheet having a single conductive layer. FIG. 11B shows a portion of a light sheet, including substrate 965 on which power conductors 920 and 920' as well as conductive elements 960 have been formed. Conductive elements 960 electrically couple LEEs 140, such that LEEs 140' are electrically coupled to power conductor 920' and LEEs 140 are electrically coupled to power conductor 920. However, as shown in FIG. 11B, power conductor 920 is discontinuous and requires a crossover in a region 1120 to form a complete circuit. FIG. 11C shows a cross-section of the structure of FIG. 11B through cut-line A-A'. As shown in FIG. 11C, conductive element 1010 associated with power conductor 920 in top housing element 120T is formed such that it does not electrically couple with power conductor 920'. In some embodiments, this may be achieved by spacing conductive element 1010 apart from power conductor 920', while in other embodiments an insulating layer, for example plastic or insulating tape or paper or other insulator may be positioned between power conductor 920' and conductive element 1010. Not shown in FIG. 11C is conductive element 1010', which is associated with power conductor 920', in top housing element 120T. FIG. 11D shows a plan view of the inside of top housing element 120T, showing both conductive elements 1010 and 1010', where conductive element 1010 has region 1120 that is designed to prevent electrical coupling to the underlying portion of power conductor 920'.

While FIGS. 11A-11C show a system having one level of electrical cross-over, this is not a limitation of the present invention, and in other embodiments more than one level of cross-over may be utilized. In some embodiments, two levels may be utilized, with a lighting system having two housing elements, with each housing element having one level of cross-over. In other embodiments, more than one level of cross-over may be utilized in a single housing element 120. While FIG. 11C shows one form of cross-over, this is not a limitation of the present invention, and in other embodiments other types of cross-overs may be formed. For example, cross-overs may be formed using any of the approaches described herein for electrically coupling multiple housing elements together.

While conductive element 1010 has been described as disposed on or part of housing 120, this is not a limitation of the present invention, and in other embodiments conductive element may be separate from housing 120. In various embodiments, conductive element 1010 may be separate from housing 120 but disposed within housing 120.

In preferred embodiments, at least a portion of housing element 120 is transparent to a wavelength of light emitted by LEEs 140. In some embodiments, substantially all of housing element 120 is transparent to a wavelength of light emitted by LEEs 140. In some embodiments, housing element 120 may include or consist essentially of glass or plastic. In some embodiments, housing element 120 may include or consist essentially of at least one of silicone, polycarbonate, acrylic, polystyrene, plexiglass, silicone, polyurethane, or the like. In some embodiments, housing element 120 may include a portion that is transparent to a wavelength of light emitted by LEEs 140 and a portion substantially not transparent to (e.g., translucent, opaque, and/or reflective to) a wavelength of light emitted by LEE 140. In some embodiments, the transparent portion of housing element 120 has a transmittance greater than 80% for a wavelength of light emitted by LEEs 140, or greater than 90% for a wavelength of light emitted by LEEs 140, or greater than 95% for a wavelength of light emitted by LEEs 140. In some embodiments, housing element 120 may include a diffuser or diffusing elements. For example, a portion or substantially all of housing element 120 may be manufactured from an optically diffusing material.

In some embodiments, housing elements 120 may include one or more optical elements, for example to modify the light distribution pattern or to change the appearance of light sheet 110, in either or both the illuminated or non-illuminated state. For example, in some embodiments the optical elements may be used to produce a specific light distribution pattern, for example a collimated light distribution pattern, a batwing light distribution pattern, an offset collimated light distribution pattern or the like, as described in U.S. patent application Ser. No. 13/693,632, filed on Dec. 4, 2012, the entirety of which is hereby incorporated by reference herein.

In some embodiments, at least one LEE is associated with at least one optical element, where the optical element is positioned to receive light from the LEE. In some embodiments, each LEE is associated with one optical element. In some embodiments, some LEEs are associated with optical elements while others are not. In some embodiments, all optical elements are the same or substantially the same, while other embodiments may include more than one type of optical element. In some embodiments, optical elements may be used to produce asymmetric or non-symmetric or arbitrary light distribution patterns.

In some embodiments, the optical elements are formed as part of housing element 120, while in other embodiments the optical elements are disposed on a surface of housing element 120, for example the interior or exterior surface of housing element 120. In some embodiments, the optical elements are disposed on light sheet 110. In some embodiments, an optical element may be a refractive optic, a reflecting optic, a total internal reflectance (TIR) optic, a Fresnel optic, or the like.

Figure 12A:
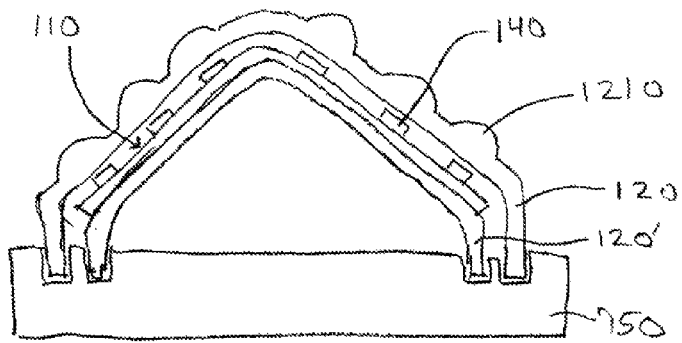
FIGS. 12A and 12B are schematic views of illumination systems in accordance with various embodiments of the invention.
Figure 12B:
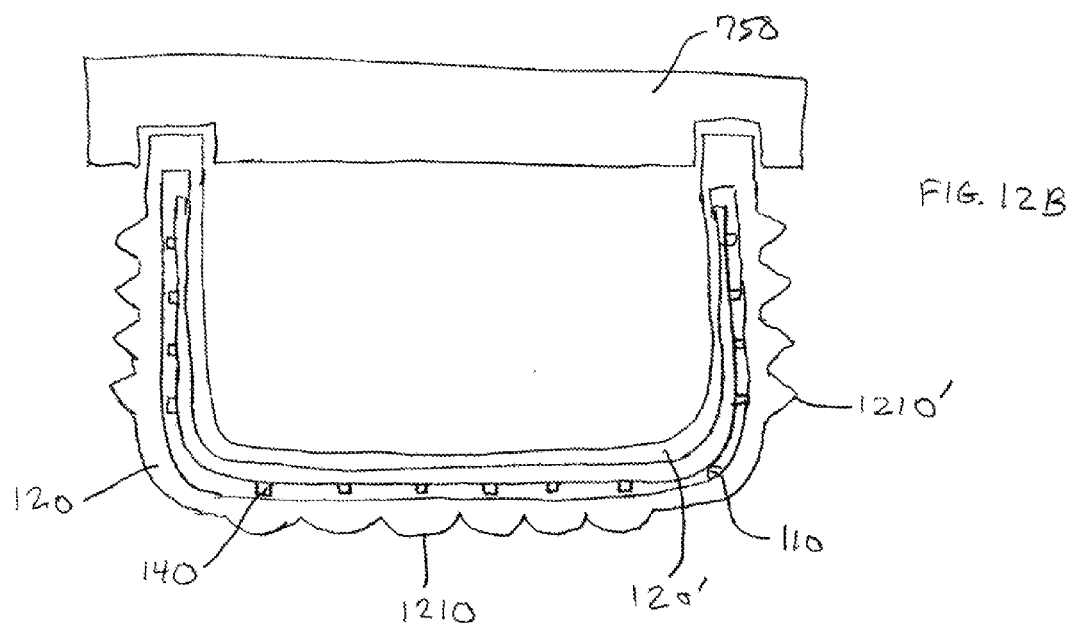

FIG. 12A shows one embodiment of the present invention in which exterior housing element 120 includes optical elements 1210. As shown in FIG. 12A, the center of each LEE 140 is aligned with or substantially aligned with the center of an optical element 1210; however, this is not a limitation of the present invention, and other embodiments may include an offset between the centers of LEEs 140 and optical elements 1210. FIG. 12B shows an embodiment of the present invention having two different types of optical elements, 1210 and 1210'. For example, in one embodiment the device of FIG. 12B may be mounted on the ceiling and optical elements 1210 may be engineered to produce a bat-wing light distribution pattern to provide uniform or substantially uniform illumination on an underlying work surface while optical elements 1210' may be engineered to produce a collimated light distribution pattern to illuminate the ceiling and walls, thus providing ambient or indirect illumination to the space. In some embodiments of the present invention, optical elements, for example optical elements 1210 and/or 1210' may be engineered to provide low glare within the space.

Figure 13A:
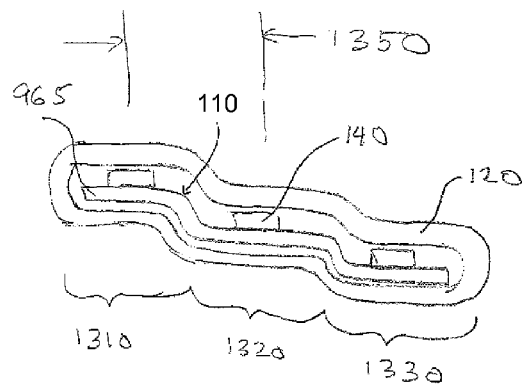
FIGS. 13A and 13B are schematic views of illumination systems in accordance with various embodiments of the invention.
Figure 13B:
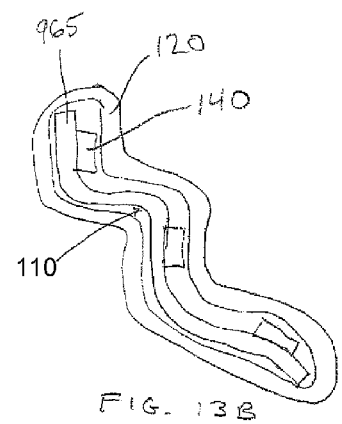

In some embodiments of the present invention, housing element 120 has sub-elements or divisions that correspond to the pitch between LEEs, or that correspond to multiples of the pitch between LEEs, for example integer multiples of the pitch between LEEs. As depicted in FIG. 13A, housing element 120 encloses light sheet 110 having three LEEs 140 or three rows of LEEs 140, and housing element 120 has three sections 1310, 1320, and 1330, each of which corresponds to one LEE or one row of LEEs, where each LEE or each row of LEEs is separated by a pitch 1350. In some embodiments, all LEEs 140 may be directed (i.e., pointing and/or positioned to emit light) in the same or substantially the same direction; however, this is not a limitation of the present invention, and in other embodiments different LEEs 140 may be directed in different directions, for example as depicted in FIG. 13B.

Figure 14A:
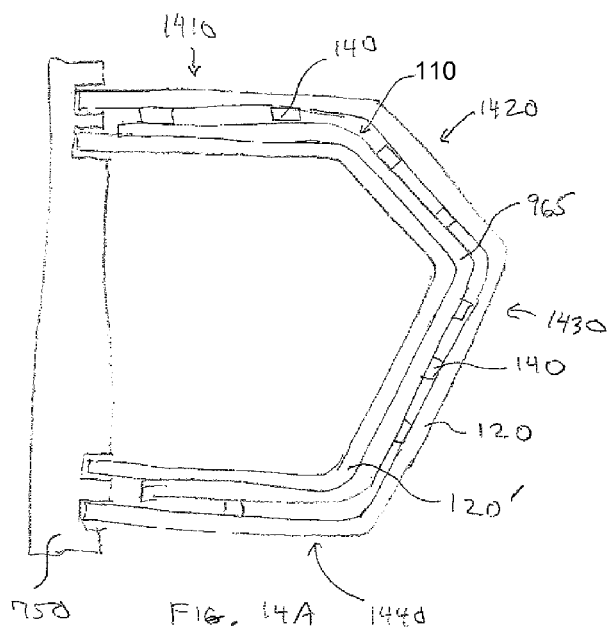
FIGS. 14A and 14B are schematic views of illumination systems in accordance with various embodiments of the invention.

FIG. 14A shows another embodiment of the present invention including interior and exterior housing elements 120', 120, each having four sides 1410, 1420, 1430, and 1440. In the depicted embodiment, sides 1410 and 1420 include two LEEs 140 or rows of LEEs 140, side 1430 includes three LEEs 140 or rows of LEEs 140, and side 1440 includes one LEE 140 or row of LEEs 140. In one embodiment, the structure of FIG. 14A may be mounted vertically (as shown) and produce a light distribution pattern such that the light intensity in a direction generally perpendicular to sides 1410 and 1420 are about the same, and are less than the light intensity in a direction generally perpendicular to side 1430 and more than the light intensity in a direction generally perpendicular to side 1440. In some embodiments, the relative light intensity emitted from different sides is proportional or substantially proportional to the number of LEEs 140 on that side. In some embodiments, all LEEs 140 are driven at the same or substantially the same current; however, this is not a limitation of the present invention, and in other embodiments different LEEs may be driven at different currents.

Figure 14B:
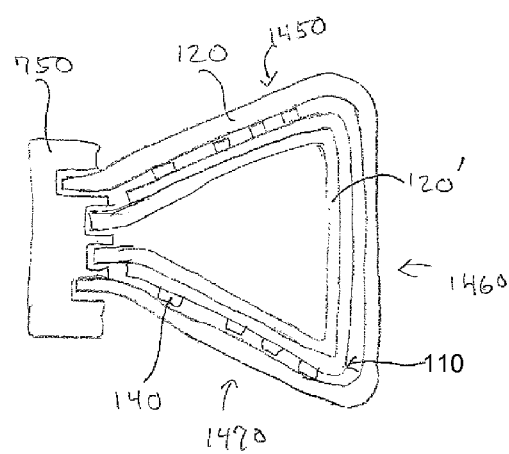

FIG. 14B shows another embodiment of the present invention including interior and exterior housing elements 120', 120, each having three sides identified as 1450, 1460, and 1470. In this embodiment, sides 1450 and 1470 have the same number of LEEs 140, while side 1460 has no LEEs 140. In some embodiments, all LEEs 140 are driven at the same current; however, this is not a limitation of the present invention, and in other embodiments different LEEs 140 may be driven at different currents. For example, in some embodiments LEEs 140 on side 1450 may be driven at a higher current than LEEs 140 on side 1470, and the light intensity in a direction generally perpendicular to side 1450 may then be higher than a light intensity in a direction generally perpendicular to side 1470. In some embodiments, light may be emitted from side 1460, for example light resulting from light scattering and/or from light emitted through the back of light sheet 110. In some embodiments, light sheet 110 and/or substrate 965 may be transparent; however, this is not a limitation of the present invention, and in other embodiments light sheet 110 and/or substrate 965 may be white or any color. In some embodiments, light sheet 110 may be translucent, while in other embodiments it may be opaque.

Figure 15A:
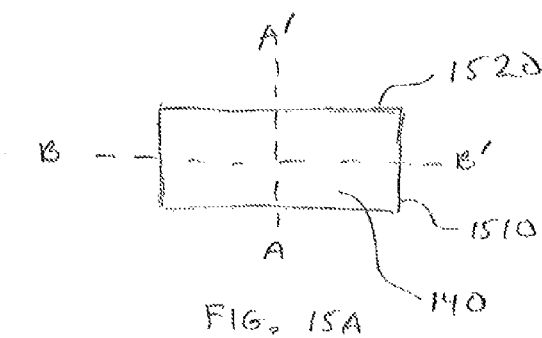
FIG. 15A is a schematic plan view of a light-emitting element in accordance with various embodiments of the invention.
Figure 15B:
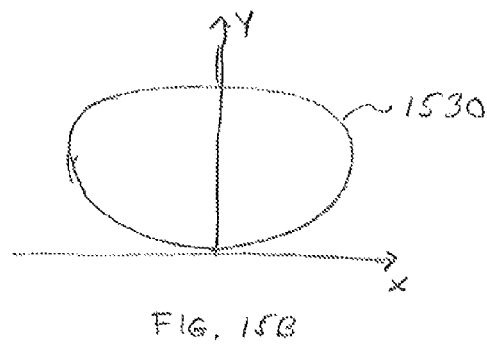
FIGS. 15B and 15C are light distribution patterns in accordance with various embodiments of the invention.
Figure 15C:
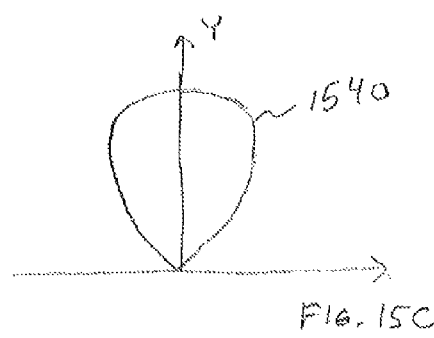
Figure 15D:
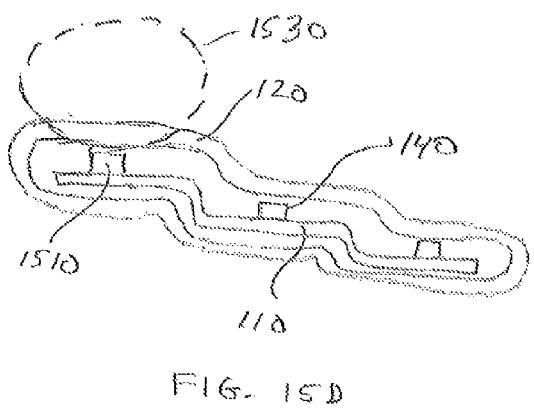
FIGS. 15D, 15E, and 15F are schematic views of illumination systems in accordance with various embodiments of the invention.

In various embodiments, the substrate or light sheet may be formed to position the LEEs in a specific orientation, for example to achieve one or more optical characteristics. For example, in various embodiments the emitting area of a LEE 140 may have a non-symmetric shape and/or may have a non-symmetric light distribution pattern with respect to the normal to the emitting plane or surface. In such embodiments, LEEs 140 may be disposed on light sheet or substrate 110 in more than one direction. For example, FIG. 15A shows a plan view (looking down on the emitting surface) of LEE 140 having a rectangular emitting surface with a long side 1520 and a short side 1510. FIG. 15B shows a schematic of one possible light distribution pattern 1530 looking perpendicular to cut line A-A', while FIG. 15C shows a possible light distribution pattern 1540 looking perpendicular to cut line B-B'. In FIGS. 15B and 15D, "x" represents a lateral dimension, "y" represents the direction orthogonal to the emitting surface, and curves 1530 and 1540 represent the intensity at a specific points in the plane defined by cut lines A-A' perpendicular to the emitting surface and in the plane defined by cut lines B-B' perpendicular to the emitting surface, respectively.

Figure 15E:
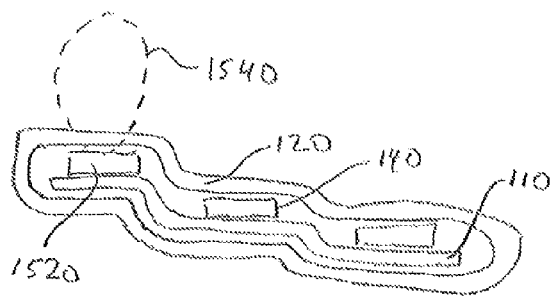
Figure 15F:
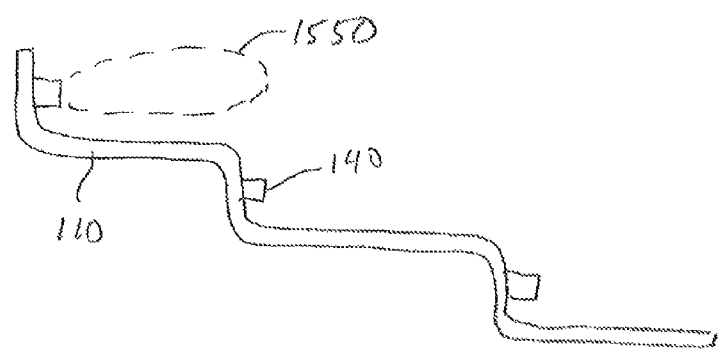

In various embodiments, LEEs 140 may be oriented in more than one direction to achieve a specific light distribution pattern. For example, FIG. 15D shows a system in which LEEs 140 are oriented with short face 1510 parallel to the plane of the drawing, resulting in light distribution pattern 1530 (shown in a dashed line). In various embodiments, LEEs 140 may be oriented with long 1520 parallel to the plane of the drawing, resulting in light distribution pattern 1540 (shown in a dashed line). In various embodiments, light sheet 110 may be oriented to direct light in various directions. For example, FIG. 15F shows an embodiment of the present invention in which light sheet 110 is shaped such that the light emission 1550 (shown in a dashed line) is substantially perpendicular to the light emission direction shown in FIGS. 15D and 15E (housing 120 is not shown in FIG. 15F for clarity). In various embodiments, light sheet 110 may be oriented such that the light emission is in any direction. In various embodiments, all LEEs 140 may be oriented in the same or substantially the same direction, while in other embodiments LEEs 140 or groups of LEEs 140 may be oriented in differing directions.

Housing element 120 may be manufactured using a variety of techniques, for example extrusion, molding, three-dimensional (3D) printing, machining, or the like. The method of manufacture of housing element 120 is not a limitation of the present invention. As utilized herein, the term "light-emitting element" (LEE) refers to any device that emits electromagnetic radiation within a wavelength regime of interest, for example, visible, infrared or ultraviolet regime, when activated, by applying a potential difference across the device or passing a current through the device. Examples of light-emitting elements include solid-state, organic, polymer, phosphor-coated or high-flux LEDs, laser diodes or other similar devices as would be readily understood. The emitted radiation of an LEE may be visible, such as red, blue or green, or invisible, such as infrared or ultraviolet. An LEE may produce radiation of a continuous or discontinuous spread of wavelengths. An LEE may feature a phosphorescent or fluorescent material, also known as a light-conversion material, for converting a portion of its emissions from one set of wavelengths to another. In some embodiments, the light from an LEE includes or consists essentially of a combination of light directly emitted by the LEE and light emitted by an adjacent or surrounding light-conversion material. An LEE may include multiple LEEs, each emitting essentially the same or different wavelengths. In some embodiments, a LEE is an LED that may feature a reflector over all or a portion of its surface upon which electrical contacts are positioned. The reflector may also be formed over all or a portion of the contacts themselves. In some embodiments, the contacts are themselves reflective. Herein "reflective" is defined as having a reflectivity greater than 65% for a wavelength of light emitted by the LEE on which the contacts are disposed. In some embodiments, an LEE may include or consist essentially of an electronic device or circuit or a passive device or circuit. In some embodiments, an LEE includes or consists essentially of multiple devices, for example an LED and a Zener diode for static-electricity protection. In some embodiments, an LEE may include or consist essentially of a packaged LED, i.e., a bare LED die encased or partially encased in a package. In some embodiments, the packaged LED may also include a light-conversion material. In some embodiments, the light from the LEE may include or consist essentially of light emitted only by the light-conversion material, while in other embodiments the light from the LEE may include or consist essentially of a combination of light emitted from an LED and from the light-conversion material. In some embodiments, the light from the LEE may include or consist essentially of light emitted only by an LED.

One or more non-LEE devices such as Zener diodes, transient voltage suppressors (TVSs), varistors, etc., may be placed on each light sheet to protect the LEEs 140 from damage that may be caused by high-voltage events, such as electrostatic discharge (ESD) or lightning strikes. In one embodiment, conductive trace segments shown in FIG. 9B or 9C between the LEE strings 950 may be used for placement of a single protection device per light sheet, where the device spans the positive and negative power traces, for example power conductors 910, 920. These trace segments also serve to provide a uniform visual pattern of lines in the web direction, which may be more aesthetically pleasing than a light sheet with noticeable gaps between LEE strings 950. In a more general sense, in addition to conductive traces 960 that are part of string 950, additional conductive traces 960 that may or may not be electrically coupled to other strings 950 and/or power conductors 910, 920 may be formed on substrate 965, for example to provide additional power conduction pathways or to achieve a decorative or aesthetically pleasing look to the pattern on the light sheet or to provide a communication pathway to one or more CEs 940, for example to provide a control signal to the one or more CEs 940. These trace segments also serve to provide a uniform visual pattern of lines in the web direction, which may be more aesthetically pleasing than a light sheet with noticeable gaps between LEE strings 950.

In one embodiment, an LEE 140 includes or consists essentially of a bare semiconductor die, while in other embodiments LEE 140 includes or consists essentially of a packaged LED.

In some embodiments, LEE 140 may include or consist essentially of a "white die" that includes an LED that is integrated with a light-conversion material (e.g., a phosphor) before being attached to the light sheet, as described in U.S. patent application Ser. No. 13/748,864, filed Jan. 24, 2013, or U.S. patent application Ser. No. 13/949,543, filed Jul. 24, 2013, the entire disclosure of each of which is incorporated by reference herein.

In some embodiments, LEEs 140 may emit light in a relatively small wavelength range, for example having a full width at half maximum in the range of about 20 nm to about 200 nm. In some embodiments, all LEEs 140 may emit light of the same or substantially the same wavelength, while in other embodiments different LEEs 140 may emit light of different wavelengths. In some embodiments LEEs 140 may emit white light, for example that is perceived as white light by the eye. In some embodiments, the white light may be visible light with a spectral power distribution the chromaticity of which is close to the blackbody locus in the CIE 1931 xy or similar color space. In some embodiments, white light has a color temperature in the range of about 2000 K to about 10,000 K. The emission wavelength, full width at half maximum (FWHM) of the emitted light or radiation or other optical characteristics of LEEs 140 may not be all the same and are not a limitation of the present invention.

Substrate 965 may include or consist essentially of a semicrystalline or amorphous material, e.g., polyethylene naphthalate (PEN), polyethylene terephthalate (PET), polycarbonate, polyethersulfone, polyester, polyimide, polyethylene, fiberglass, FR4, metal core printed circuit board, (MCPCB), and/or paper. Substrate 965 may include multiple layers, for example, a semicrystalline or amorphous material, e.g., PEN, PET, polycarbonate, polyethersulfone, polyester, polyimide, polyethylene, and/or paper formed over a second substrate for example comprising, acrylic, aluminum, steel and the like. Depending upon the desired application for which embodiments of the invention are utilized, substrate 965 may be substantially optically transparent, translucent, or opaque. For example, substrate 965 may exhibit a transmittance or a reflectivity greater than 70% for optical wavelengths ranging between approximately 400 nm and approximately 700 nm. In some embodiments substrate 965 may exhibit a transmittance or a reflectivity of greater than 70% for one or more wavelengths emitted by LEE 140. Substrate 965 may also be substantially insulating, and may have an electrical resistivity greater than approximately 100 ohm-cm, greater than approximately $1 \times 10^6$ ohm-cm, or even greater than approximately $1 \times 10^{10}$ ohm-cm. In some embodiments substrate 965 may have a thickness in the range of about 10 µm to about 500 µm.

Conductive elements, e.g., power conductors 910, 920 and conductive traces 960, may be formed via conventional deposition, photolithography, and etching processes, plating processes, lamination, lamination and patterning, evaporation sputtering or the like or may be formed using a variety of different printing processes. For example, power conductors 910, 920 and conductive traces 960 may be formed via screen printing, flexographic printing, ink-jet printing, and/or gravure printing. Power conductors 910, 920 and conductive traces 960 may include or consist essentially of a conductive material (e.g., an ink or a metal, metal film or other conductive materials or the like), which may include one or more elements such as silver, gold, aluminum, chromium, copper, and/or carbon. Power conductors 910, 920 and conductive traces 960 may have a thickness in the range of about 50 nm to about 1000 µm. In some embodiments, the thickness of power conductors 910, 920 and conductive traces 960 may be determined by the current to be carried thereby. While the thickness of one or more of power conductors 910, 920 and conductive traces 960 may vary, the thickness is generally substantially uniform along the length of the trace to simplify processing. However, this is not a limitation of the present invention, and in other embodiments the thickness and/or material of power conductors 910, 920 and conductive traces 960 may vary. In some embodiments, all or a portion of power conductors 910, 920 and conductive traces 960 may be covered or encapsulated. In some embodiments, a layer of material, for example insulating material, may be formed over all or a portion of power conductors 910, 920 and conductive traces 960. Such a material may include, e.g., a sheet of material such as used for substrate 265, a printed layer, for example using screen, ink jet, stencil or other printing means, a laminated layer, or the like. Such a printed layer may include, for example, an ink, a plastic and oxide, or the like. The covering material and/or the method by which it is applied is not a limitation of the present invention.

In one embodiment, conductive traces 960 are formed with a gap between adjacent conductive traces 960, and LEEs 140 and CEs 940 are electrically coupled to conductive traces 960 using conductive adhesive, e.g., an isotropically conductive adhesive and/or an ACA, as described in U.S. Pat. No. 8,384,121, filed on Jun. 29, 2011, the entire disclosure of which is incorporated herein by reference. ACAs may be utilized with or without stud bumps and embodiments of the present invention are not limited by the particular mode of operation of the ACA. For example, the ACA may utilize a magnetic field rather than pressure (e.g., the ZTACH ACA available from SunRay Scientific of Mt. Laurel, N.J., for which a magnetic field is applied during curing in order to align magnetic conductive particles to form electrically conductive "columns" in the desired conduction direction). Furthermore, various embodiments utilize one or more other electrically conductive adhesives, e.g., isotropically conductive adhesives, non-conductive adhesives, in addition to or instead of one or more ACAs. In other embodiments, LEEs 140 and CEs 940 may be attached to and/or electrically coupled to conductive traces 960 by other means, for example solder, reflow solder, wave solder, wire bonding, or the like. The method by which LEEs 140 and CEs 940 are attached to conductive traces 960 is not a limitation of the present invention.

CE 940 may be one component or multiple active and/or passive components. In one embodiment, power conductors 910, 920 provide a DC voltage or substantially DC voltage and CE 940 includes or consists essentially of a resistor, e.g. a current-limiting resistor. The choice of the resistance value may be a trade-off between a number of parameters and characteristics that may include, e.g., efficiency and current stability. In general, a larger resistance will result in reduced efficiency but greater current stability, while a smaller resistance will result in increased efficiency but reduced current stability. Variations in the current may result from variations in the input voltage (for example across power conductors 910, 920), variations in forward voltage of the LEEs 140 within the string, variations in the value of the current-limiting resistor, variations in current that may occur if one or more LEEs 140 in the string become short-circuited or the like. In the case of CE 940 including or consisting essentially of a resistor, in some embodiments CE 940 is a discrete resistor formed within or on conductive traces 960, such as a chip resistor, a bare-die resistor or surface mount device (SMD) resistor.

As discussed above, in embodiments where CE 940 includes or consists essentially of a resistor, there may be trade-offs between efficiency and current stability. While such trade-offs may be acceptable in certain products, other products may require relatively better current stability at higher efficiencies, and in these cases CE 940 may include or consist essentially of multiple components or a circuit element, as discussed above. In some embodiments CE 940 includes or consists essentially of a field-effect transistor (FET) and a resistor. In another embodiment CE 940 includes or consists essentially of two bipolar junction transistors (BJTs) and two resistors.

In some embodiments, the efficiency and current stability increase with the number of components, as does the cost. In some embodiments where CE 940 includes or consists essentially of multiple components, the components may be in discrete form (i.e., each component individually electrically coupled to conductive traces 960) or in hybrid form (where multiple separate components are mounted on a submount, which is then electrically coupled to conductive traces 960), or in monolithic form (where multiple components are integrated on a semiconductor chip, for example a silicon-based or other semiconductor-based integrated circuit). In some embodiments, CE 940 may be in bare-die form, while in other embodiments CE 940 may be packaged or potted or the like. In some embodiments, CE 940 may include or consist essentially of a bare-die integrated circuit. In some embodiments, the integrated circuit includes or consists essentially of multiple active and/or passive devices that are fabricated on a common semiconductor substrate.

In other embodiments, power conductors 910, 920 may provide AC power, or power modulated at different frequencies and in these embodiments CEs 940 may be selected accordingly or may be omitted. In one embodiment, power conductors 910, 920 may provide a standard line voltage, for example about 120 VAC or about 940 VAC or about 277 VAC, for example at about 50 Hz or about 60 Hz. In some embodiments, CEs 940 may accommodate a plurality of input types, and thus be so-called "universal" CEs 940, while in other embodiments different CEs 940 may be required for different input types. The actual component or components of CEs 940 are not limiting to this invention; however, in preferred embodiments of this invention, the positioning of CEs 940 does not disrupt the LEE pitch. In another embodiment of this invention, the positioning of CEs 940 is independent of LEE pitch. As discussed herein, CEs 940 and LEEs 230 may be electrically coupled to conductive traces 960 using a variety of means, for example solder, conductive adhesive or anisotropic conductive adhesive (ACA); however, the method of electrical coupling of CEs 140 and LEEs 230 is not a limitation of the present invention.

In some embodiments driver 710 is a substantially constant voltage supply, the output of which is pulse-width modulated to permit dimming of LEEs 140 on light sheet 110. In some embodiments, driver 710 is a UL class 2 system having a voltage output not exceeding 60 V.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A lighting system comprising:
  a housing having a three-dimensional, non-planar interior volume at least partially enclosed by an interior surface, wherein a first portion of the interior volume has a first curvature; and
  a flexible light sheet comprising (i) a flexible substrate having first and second opposed surfaces, (ii) a plurality of light-emitting elements disposed over at least one of the first or second surfaces of the substrate, and (iii) a plurality of conductive traces disposed on the substrate and electrically interconnecting the plurality of light-emitting elements, wherein, when the light sheet is in an undeformed configuration, (a) the light sheet is substantially planar and (b) the light-emitting elements of the light sheet collectively emit light having a first spatial optical characteristic,
  wherein (i) the light sheet is disposed within the interior volume of the housing, (ii) the light sheet is deformed to conform to the interior volume of the housing, (iii) the light-emitting elements of the light sheet collectively emit light through the housing with a second spatial optical characteristic different from the first spatial optical characteristic, and (iv) only one or more portions, but not the entirety, of the light sheet are in contact with the interior surface such that a portion of the light sheet, disposed within the first portion of the interior volume, is deformed to have a second curvature different from the first curvature.

2. The lighting system of claim 1, wherein the first and second spatial optical characteristics comprise luminous intensity distributions.

3. The lighting system of claim 1, wherein the first and second spatial optical characteristics each comprise at least one of a luminous intensity distribution, a correlated color temperature distribution, a color rendering index distribution, or a spectral power distribution.

4. The lighting system of claim 1, wherein the deformed light sheet comprises at least two portions each having a different curvature.

5. The lighting system of claim 1, wherein the deformed light sheet comprises at least two portions, at least one portion being substantially planar.

6. The lighting system of claim 1, wherein the deformed light sheet comprises at least one fold.

7. The lighting system of claim 1, wherein the light-emitting elements are disposed over both the first and second surfaces of the substrate.

8. The lighting system of claim 1, wherein the housing defines an opening, at least at one of two opposed ends, for accessing the interior volume.

9. The lighting system of claim 1, wherein the housing defines an opening for accessing the interior volume, and further comprising at least one end cap for covering the opening.

10. The lighting system of claim 1, wherein the housing comprises mounting hardware for mounting the lighting system.

11. The lighting system of claim 1, wherein the light sheet comprises first and second spaced-apart power conductors for supplying power to the light-emitting elements.

12. The lighting system of claim 1, further comprising one or more electrical connectors disposed on the housing.

13. The lighting system of claim 12, wherein (a) the light sheet comprises first and second spaced-apart power conductors for supplying power to the light-emitting elements, and (b) the one or more electrical connectors comprise (i) a first electrical connector electrically coupled to the first power conductor and (ii) a second electrical connector electrically coupled to the second power conductor.

14. The lighting system of claim 11, further comprising one or more electrical connectors extending outside of the housing, the one or more electrical connectors providing electrical coupling to at least one of the first or second power conductors from outside of the housing.

15. The lighting system of claim 11, wherein:
  the plurality of light-emitting elements are spaced apart and interconnected, via the plurality of conductive traces, into one or more light-emitting strings, and
  each light-emitting string has (i) a first end electrically connected to the first power conductor and (ii) a second end electrically connected to the second power conductor.

16. The lighting system of claim 15, further comprising one or more control elements each configured to control current to one or more of the light-emitting strings.

17. The lighting system of claim 15, wherein the substrate is separable, via a cut spanning the first and second power conductors and not crossing a first light-emitting string, into two partial substrates each comprising (i) one or more light-emitting strings and (ii) portions of the first and second power conductors configured to supply power to and thereby illuminate the one or more light-emitting strings of the partial substrate.

18. The lighting system of claim 15, wherein, along each light-emitting string, a first pitch at which the first light-emitting elements are spaced is substantially constant.

19. The lighting system of claim 18, wherein:
the one or more light-emitting strings comprise a plurality of light-emitting strings, and
over the substrate, the light-emitting elements are spaced apart at the first pitch, the first pitch being maintained between light-emitting elements of different ones of the light-emitting strings.

20. The lighting system of claim 1, further comprising a power supply for energizing the plurality of light-emitting elements.

21. The lighting system of claim 1, further comprising at least one sensing element disposed within or on the housing.

22. The lighting system of claim 1, wherein the housing is in thermal contact with at least one of (i) at least a portion of the substrate or (ii) at least one of the light-emitting elements, whereby the housing is a heat sink for at least one of (i) at least a portion of the substrate or iii) at least one of the light-emitting elements.

23. The lighting system of claim 1, wherein the light-emitting elements emit substantially white light.

24. The lighting system of claim 1, wherein at least a portion of the housing is transparent to a wavelength of light emitted by the light-emitting elements.

25. The lighting system of claim 1, wherein the housing defines one or more optical elements.

26. The lighting system of claim 1, wherein a spacing between at least one of the first or second surfaces of the flexible substrate and the interior surface of the housing adjacent thereto is non-uniform across at least a portion of the flexible substrate.

27. The lighting system of claim 26, wherein (i) the light-emitting elements are disposed on the first surface of the flexible substrate, and (ii) the spacing between the second surface of the flexible substrate and the interior surface of the housing adjacent to the second surface of the flexible substrate is non-uniform across at least a portion of the flexible substrate.

28. The lighting system of claim 26, wherein (i) the light-emitting elements are disposed on the first surface of the flexible substrate, and (ii) the spacing between the first surface of the flexible substrate and the interior surface of the housing adjacent to the first surface of the flexible substrate is non-uniform across at least a portion of the flexible substrate.

29. The lighting system of claim 1, wherein the light-emitting elements are uniformly spaced apart over the flexible substrate.

30. The lighting system of claim 1, wherein (i) light-emitting elements disposed over a first portion of the flexible substrate are spaced apart at a first spacing, and (ii) light-emitting elements disposed over a second portion of the flexible substrate different from the first portion are spaced apart at a second spacing different from the first spacing.

31. The lighting system of claim 1, wherein the housing is rigid.

32. The lighting system of claim 1, wherein no portion of the light sheet has the first curvature.

33. The lighting system of claim 1, wherein at least one light-emitting element is in direct physical contact with the interior surface of the housing.

34. The lighting system of claim 1, wherein (i) at least one first light-emitting element is in direct physical contact with the interior surface of the housing, and (ii) at least one second light-emitting element is spaced apart from the interior surface of the housing.

35. The lighting system of claim 21, wherein the at least one sensing element comprises at least one of a light sensor, an occupancy sensor, a temperature sensor, a smoke detector, or a fire detector.

36. The lighting system of claim 1, wherein the lighting system has an ingress protection rating of at least IP 65, as specified by International Protection Marking in International Electrotechnical Commission (IEC) standard 60529.

37. The lighting system of claim 1, wherein the housing is U-shaped, the first portion of the interior volume being disposed between two planar portions of the housing.

* * * * *

UNITED STATES PATENT AND TRADEMARK OFFICE
CERTIFICATE OF CORRECTION

| | |
|---|---|
| PATENT NO. | : 9,696,019 B2 |
| APPLICATION NO. | : 14/711891 |
| DATED | : July 4, 2017 |
| INVENTOR(S) | : Paul Palfreyman et al. |

It is certified that error appears in the above-identified patent and that said Letters Patent is hereby corrected as shown below:

In the Claims

In Claim 22, Column 29, Line 31, after substrate or; change "iii)" to --(ii)--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*